United States Patent
Nam et al.

(10) Patent No.: US 12,418,811 B2
(45) Date of Patent: Sep. 16, 2025

(54) MONITORING OTHER SEARCH SPACES NEAR A COMMON SEARCH SPACE

(71) Applicant: QUALCOMM Incorporated, San Diego, CA (US)

(72) Inventors: Wooseok Nam, San Diego, CA (US); Jing Sun, San Diego, CA (US); Tao Luo, San Diego, CA (US); Xiaoxia Zhang, San Diego, CA (US); Jae Ho Ryu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 17/657,891

(22) Filed: Apr. 4, 2022

(65) Prior Publication Data

US 2022/0322114 A1    Oct. 6, 2022

Related U.S. Application Data

(60) Provisional application No. 63/170,978, filed on Apr. 5, 2021.

(51) Int. Cl.
*H04W 24/08* (2009.01)
*H04W 72/044* (2023.01)
(Continued)

(52) U.S. Cl.
CPC ......... *H04W 24/08* (2013.01); *H04W 72/046* (2013.01); *H04W 72/1263* (2013.01); *H04W 72/20* (2023.01)

(58) Field of Classification Search
CPC .... H04L 5/0044; H04L 5/0048; H04W 24/08; H04W 48/12; H04W 72/046; H04W 72/20; H04W 72/232; H04W 72/1263
(Continued)

(56) References Cited

U.S. PATENT DOCUMENTS

| 2017/0134880 A1 | 5/2017 | Rico Alvarino et al. |
| 2020/0107245 A1* | 4/2020 | Takeda ................ H04W 48/12 |
| 2023/0344576 A1* | 10/2023 | Lim ...................... H04L 5/0044 |

FOREIGN PATENT DOCUMENTS

| EP | 3200530 A1 | 8/2017 |
| EP | 3843305 A1 | 6/2021 |

(Continued)

OTHER PUBLICATIONS

International Search Report and Written Opinion—PCT/US2022/071544—ISA/EPO—Jul. 19, 2022.

*Primary Examiner* — Harun Chowdhury
(74) *Attorney, Agent, or Firm* — Paul M. McAdams; Harrity & Harrity, LLP

(57) ABSTRACT

Various aspects of the present disclosure generally relate to wireless communication. In some aspects, a user equipment (UE) may determine a first zone that includes one or more symbols at or before a scheduled common search space (CSS) and/or a second zone that includes one or more symbols at or after the scheduled CSS. The UE may monitor, or refrain from monitoring, a UE-specific search space at least partially included in the first zone, at least partially included in the second zone, or at least partially included in a combination of the first zone and the second zone. The first zone may include a first quantity of symbols and exclude a second quantity of symbols before the scheduled CSS, and the second zone may include a third quantity of symbols and exclude a fourth quantity of symbols after the scheduled CSS. Numerous other aspects are described.

30 Claims, 9 Drawing Sheets

400 ⟶

(51) Int. Cl.
*H04W 72/1263* (2023.01)
*H04W 72/20* (2023.01)

(58) Field of Classification Search
USPC ........................................ 370/280, 329, 330
See application file for complete search history.

(56) References Cited

FOREIGN PATENT DOCUMENTS

| | | |
|---|---|---|
| EP | 3941132 A1 | 1/2022 |
| WO | WO-2020063193 A1 | 4/2020 |
| WO | WO-2020200133 A1 | 10/2020 |

* cited by examiner

MONITORING OTHER SEARCH SPACES NEAR A COMMON SEARCH SPACE

CROSS-REFERENCE TO RELATED APPLICATION

This Patent application claims priority to U.S. Provisional Patent Application No. 63/170,978, filed on Apr. 5, 2021, entitled "MONITORING OTHER SEARCH SPACES NEAR A COMMON SEARCH SPACE," and assigned to the assignee hereof. The disclosure of this prior Provisional Application is considered part of and is incorporated by reference in this Patent Application in its entirety.

FIELD OF THE DISCLOSURE

Aspects of the present disclosure generally relate to wireless communication and to techniques and apparatuses for monitoring other search spaces near a common search space.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, an apparatus for wireless communication includes a memory and one or more processors coupled to the memory, wherein the one or more processors are configured to determine a first zone that includes one or more symbols at or before a scheduled common search space (CSS), a second zone that includes one or more symbols at or after the scheduled CSS, or a combination of the first zone and the second zone; and monitor, or refrain from monitoring, an apparatus-specific search space at least partially included in the first zone, at least partially included in the second zone, or at least partially included in a combination of the first zone and the second zone.

In some aspects, an apparatus for wireless communication includes a memory and one or more processors coupled to the memory, wherein the one or more processors are configured to determine, for a user equipment (UE), a first zone that includes one or more first symbols at or before a scheduled CSS, a second zone that includes one or more first symbols at or after the scheduled CSS, or a combination of the first zone and the second zone; and transmit, or refrain from transmitting, within a UE-specific search space at least partially included in the first zone, at least partially included in the second zone, or at least partially included in a combination of the first zone and the second zone.

In some aspects, a method of wireless communication performed by an apparatus includes determining a first zone that includes one or more symbols at or before a scheduled CSS, a second zone that includes one or more symbols at or after the scheduled CSS, or a combination of the first zone and the second zone; and monitoring, or refraining from monitoring, an apparatus-specific search space at least partially included in the first zone, at least partially included in the second zone, or at least partially included in a combination of the first zone and the second zone.

In some aspects, a method of wireless communication performed by an apparatus includes determining, for a UE, a first zone that includes one or more first symbols at or before a scheduled CSS, a second zone that includes one or more first symbols at or after the scheduled CSS, or a combination of the first zone and the second zone; and transmitting, or refraining from transmitting, within a UE-specific search space at least partially included in the first zone, at least partially included in the second zone, or at least partially included in a combination of the first zone and the second zone.

In some aspects, a non-transitory computer-readable medium has instructions stored thereon that, when executed by one or more processors of an apparatus, cause the apparatus to determine a first zone that includes one or more symbols at or before a scheduled CSS, a second zone that includes one or more symbols at or after the scheduled CSS, or a combination of the first zone and the second zone; and monitor, or refraining from monitoring, an apparatus-specific search space at least partially included in the first zone, at least partially included in the second zone, or at least partially included in a combination of the first zone and the second zone.

In some aspects, a non-transitory computer-readable medium has instructions stored thereon that, when executed by one or more processors of an apparatus, cause the apparatus to determine, for a UE, a first zone that includes one or more first symbols at or before a scheduled CSS, a second zone that includes one or more first symbols at or after the scheduled CSS, or a combination of the first zone and the second zone; and transmit, or refraining from transmitting, within a UE-specific search space at least partially included in the first zone, at least partially included in the second zone, or at least partially included in a combination of the first zone and the second zone.

In some aspects, an apparatus for wireless communication includes means for determining a first zone that includes one or more symbols at or before a scheduled CSS, a second zone that includes one or more symbols at or after the scheduled CSS, or a combination of the first zone and the second zone; and means for monitoring, or means for refraining from monitoring, an apparatus-specific search space at least partially included in the first zone, at least partially included in the second zone, or at least partially included in a combination of the first zone and the second zone.

In some aspects, an apparatus for wireless communication includes means for determining, for a UE, a first zone that includes one or more first symbols at or before a scheduled CSS, a second zone that includes one or more first symbols at or after the scheduled CSS, or a combination of the first zone and the second zone; and means for transmitting, or means for refraining from transmitting, within a UE-specific search space at least partially included in the first zone, at least partially included in the second zone, or at least partially included in a combination of the first zone and the second zone.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
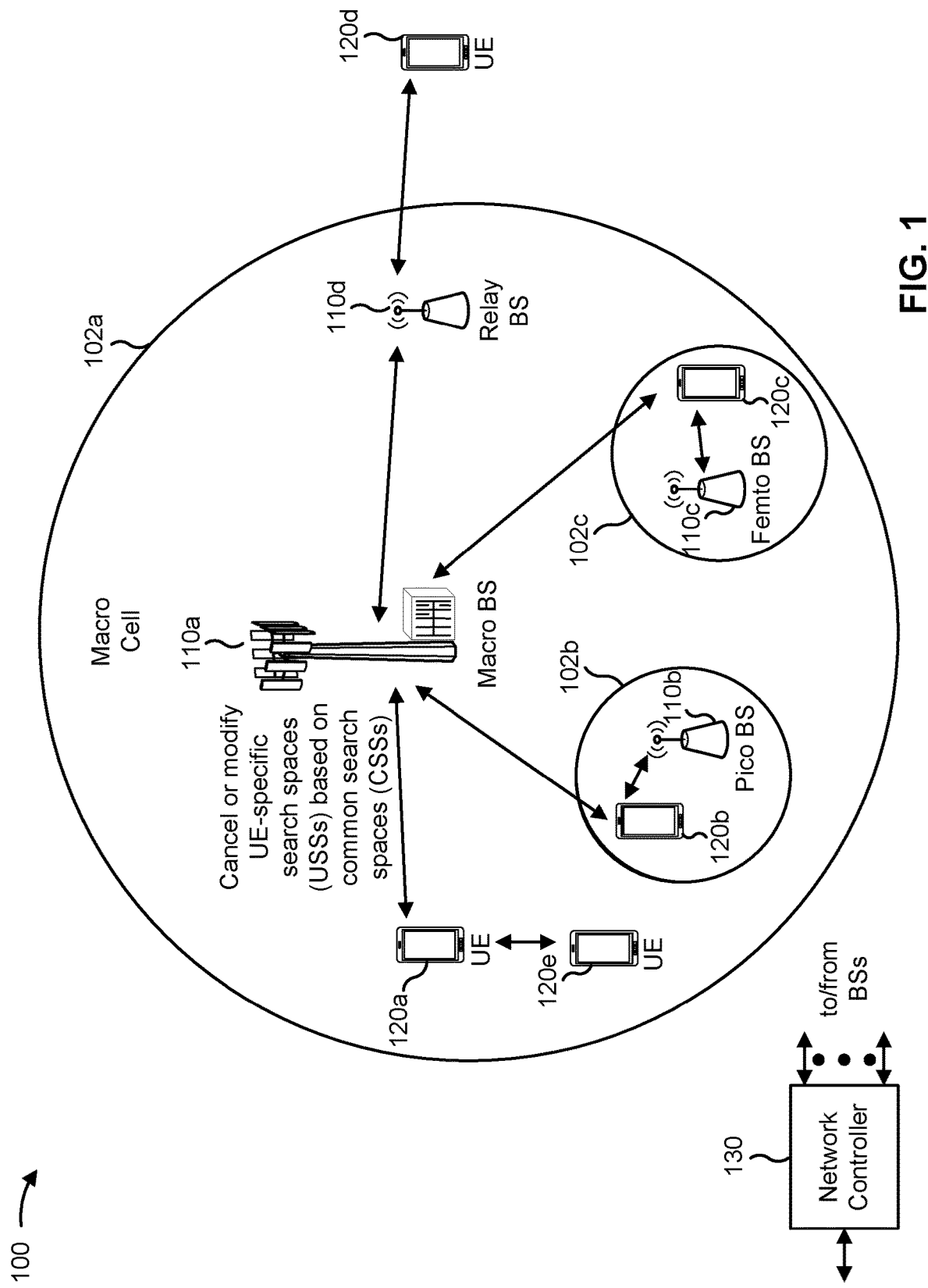
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

In some aspects, a UE (e.g., the UE 120a) and a BS (e.g., the BS 110a) may determine a first zone before and/or a second zone after a common search space (CSS) such that other search spaces (e.g., UE-specific search spaces (USSs)) that are at least partially included in the first zone and/or the second zone, respectively, are either cancelled or modified. Accordingly, the UE 120a may refrain from monitoring, and the BS 110a may refrain from transmitting within, a USS that is at least partially included in the first zone and/or the second zone. As an alternative, the UE 120a may monitor, and the BS 110a may transmit within, a USS that is at least partially included in the first zone and/or the second zone, according to one or more modifications and/or conditions, as described elsewhere herein.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
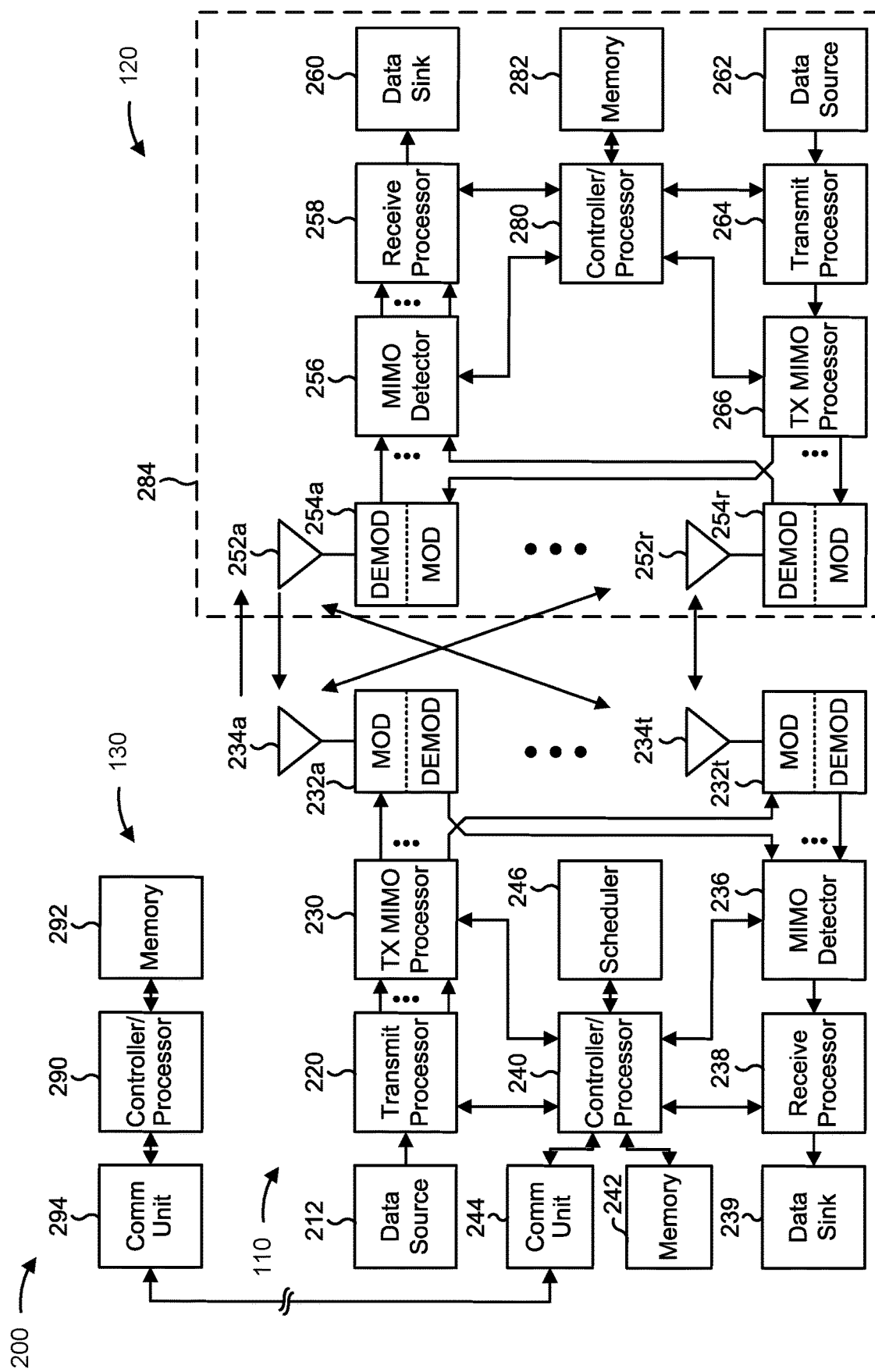
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 4A-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 4A-6).

Controller/processor 240 of base station 110, controller/processor 280 of UE 120, and/or any other component(s) of FIG. 2 may perform one or more techniques associated with monitoring other search spaces near a CSS, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, a UE (e.g., the UE 120 and/or apparatus 700 of FIG. 7) may include means for determining a first zone that includes one or more symbols at or before a scheduled CSS, a second zone that includes one or more symbols at or after the scheduled CSS, or a combination thereof; and/or means for monitoring, or means for refraining from monitoring, a UE-specific search space at least partially included in the first zone, at least partially included in the second zone, or a combination thereof. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a base station (e.g., the base station 110 and/or apparatus 800 of FIG. 8) may include means for determining, for a UE (e.g., the UE 120 and/or apparatus 700 of FIG. 7), a first zone that includes one or more first symbols at or before a scheduled CSS, a second zone that includes one or more first symbols at or after the scheduled CSS, or a combination thereof; and/or means for transmitting, or means for refraining from transmitting, within a UE-specific search space at least partially included in the first zone, at least partially included in the second zone, or a combination thereof. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some aspects, a base station (e.g., base station 110) may broadcast a synchronization signal block (SSB), which may include a primary synchronization signal (PSS) and a secondary synchronization signal (SSS) centralized within a physical broadcast channel (PBCH). Accordingly, the SSB may also be referred to as an SS/PBCH block.

Accordingly, a UE (e.g., UE 120) may detect the PSS and/or the SSS to determine a physical cell identifier (PCID) associated with the base station 110 and a timing associated with the PBCH. Accordingly, the UE 120 may decode the PBCH to obtain a master information block (MIB) message. The MIB message may include frequency and timing information to allow the UE 120 to establish a radio resource control (RRC) connection with a cell including the base station 110, as well as including information for scheduling reception of remaining minimum system information (RMSI) by the UE 120. For example, the MIB message may include a pdcch-ConfigSIB1 data structure (e.g., as defined in 3GPP specifications and/or another standard) and/or another similar data structure defining a search space (e.g., in a physical downlink control channel (PDCCH) and/or the like) in which the UE 120 may receive scheduling information for the RMSI. This search space may be referred to as a Type0-PDCCH common search space (CSS).

In some aspects, the MIB message may include information associated with a control resource set (CORESET) configuration defining physical resources (e.g., one or more frequency resources, one or more time resources, and/or other resources) for monitoring the Type0-PDCCH CSS. Accordingly, this CORESET may be referred to as a Type0-PDCCH CORESET.

For other CSSs (e.g., a Type0A-PDCCH CSS associated with additional SIB messages, a Type1-PDCCH CSS associated with a random access response (RAR), and/or a Type2-PDCCH CSS associated with a paging occasion (PO)), the base station 110 may instruct the UE 120 to monitor a similar set of monitoring occasions that includes monitoring occasions in consecutive slots (e.g., by setting a SearchSpaceId for searchSpaceOtherSystemInformation, ra-SearchSpace, and/or pagingSearchSpace in PDCCH-ConfigCommon, as defined in 3GPP specifications and/or another standard, to zero). These other CSSs may similarly be associated with corresponding CORESET configurations defining physical resources for monitoring the CSSs (e.g., a Type0A-PDCCH CSS, a Type1-PDCCH CSS, and/or a Type2-PDCCH CSS, as described above). Accordingly, these corresponding CORESETs may be referred to as a Type0A-PDCCH CORESET, a Type1-PDCCH CORESET, or a Type2-PDCCH CORESET, respectively.

Figure 3:
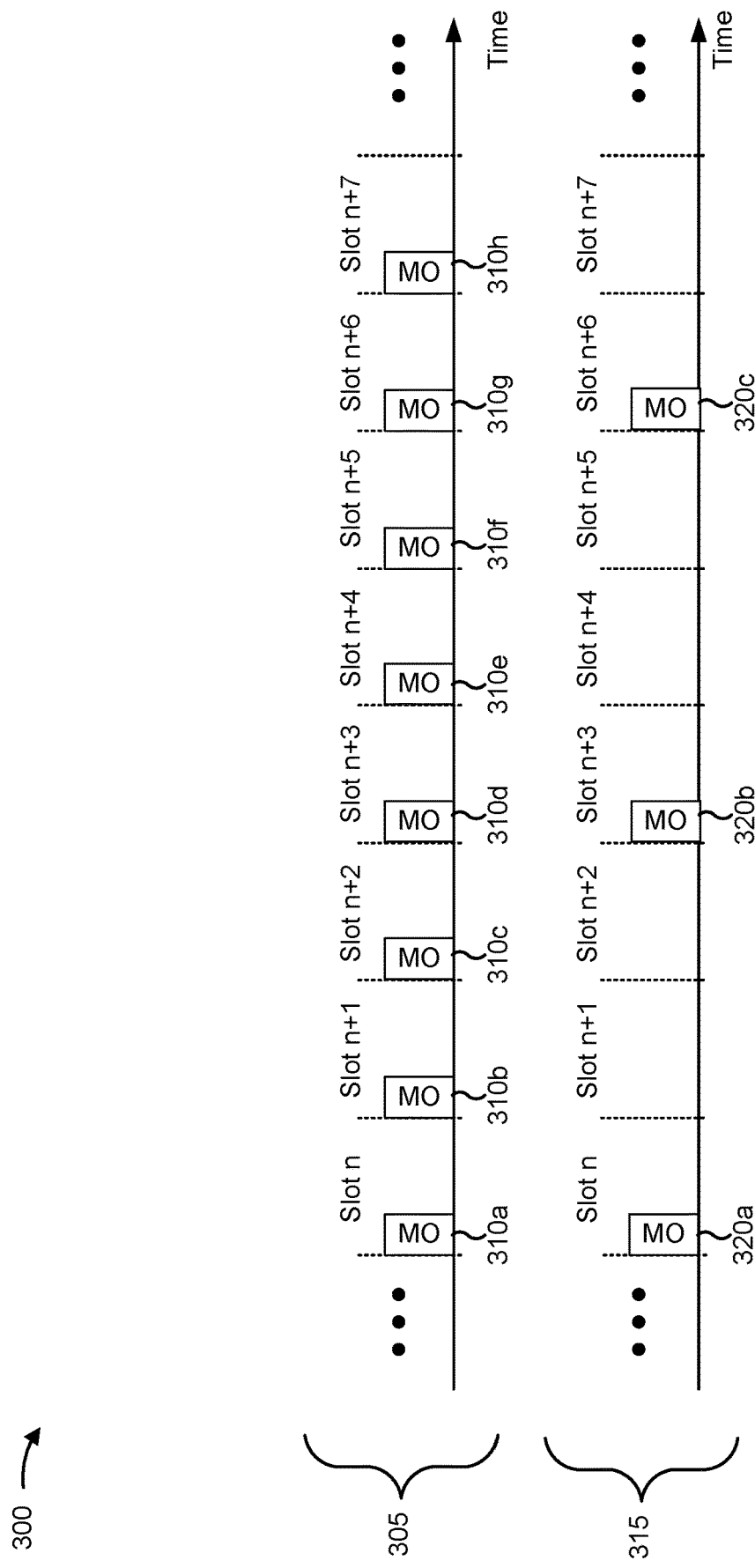
FIG. 3 is a diagram illustrating an example of multi-slot monitoring for common search spaces (CSSs), in accordance with the present disclosure.

FIG. 3 is a diagram illustrating an example 300 of multi-slot monitoring for CSSs, in accordance with the present disclosure. As shown in FIG. 3, a UE (e.g., UE 120) may monitor a set 305 of monitoring occasions (MOs) that are consecutive across slots. As used herein, "slot" may refer to a portion of a subframe, which in turn may be a fraction of a radio frame within an LTE, 5G, or other wireless communication structure. In some aspects, a slot may include one or more symbols. Additionally, "symbol" may refer to an OFDM symbol or another similar symbol within a slot. The set 305 of MOs may be associated with a CSS.

In example 300, the set 305 includes an MO 310*a* in slot n, where n represents an integer. Although shown at the beginning of slot n, MO 310*a* may be configured to include one or more symbols anywhere within slot n. The set 305 includes MOs that are consecutive across slots. Accordingly, in the set 305, MO 310*b* is in slot n+1. These consecutive MOs may repeat in time. In example 300, this repetition is in every slot such that MO 310*c* is in slot n+2 and MO 310*d* is in slot n+3, MO 310*e* is in slot n+4 and MO 310*f* is in slot n+5, and MO 310*g* is in slot n+6 and MO 310*h* is in slot n+7, and so on. Although the consecutive MOs repeat every slot in example 300, the consecutive MOs may repeat in every other slot (e.g., with MO 310*c* in slot n+3 and MO 310*d* in slot n+4, and so on), in every third slot (e.g., with MO 310*c* in slot n+4 and MO 310*d* in slot n+5, and so on), or according to larger periods.

In higher frequencies (e.g., between 52.6 GHz and 114.25 GHz), phase noise may increase. Accordingly, to reduce the impact of phase noise, a wireless network may employ larger subcarrier spacings (SCSs). As used herein, "subcarrier spacing" or "SCS" may refer to a range of frequencies (or an amount of bandwidth) between subcarriers used on a cell of the wireless network. For example, a cell configured for FR2 may use an SCS between 60 kHz and 120 kHz while a cell configured for higher frequencies may use an SCS between 240 kHz and 1.92 MHz. Larger SCS results in slots with shorter length. For example, a slot in FR2 with 120 kHz SCS may be approximately 125 µs in length while a slot in higher frequencies with 960 kHz SCS may be approximately 15.6 µs in length.

Accordingly, as further shown in FIG. 3, because the slot is shorter in duration, the UE 120 may monitor a set 315 of MOs that are non-consecutive across slots. The set 315 of MOs may be associated with a CSS. In example 300, the set 315 includes an MO 320*a* in slot n, where n represents an integer. Although shown at the beginning of slot n, MO 320*a* may be configured to include one or more symbols anywhere within slot n. The set 315 includes MOs that are non-consecutive across slots. Accordingly, in the set 315, MO 320*b* is in slot n+3, MO 320*c* is in slot n+6, and so on. Although the non-consecutive MOs repeat every third slot in example 300, the consecutive MOs may repeat in every other slot (e.g., with MO 320*b* in slot n+2 and MO 320*c* in slot n+4, and so on), in every fourth slot (e.g., with MO 320*b* in slot n+4 and MO 320*c* in slot n+8, and so on), or according to larger periods.

In some situations, a base station may schedule one or more other search spaces for a UE (e.g., USSs for the UE) sufficiently separate in time from one or more CSSs for the base station. Accordingly, the UE may have time to monitor a CSS for the base station and decode any signal transmitted therein before subsequently being scheduled to monitor a USS and decode any signal transmitted therein. However, sometimes the base station may have to schedule one or more USSs closer in time to one or more CSSs for the base station (e.g., due to limited resources available within a cell including the base station). Accordingly, the UE may consume larger amounts of power by decoding a signal that was transmitted within an earlier USS simultaneously with monitoring a CSS, or by decoding a signal that was transmitted within an earlier CSS simultaneously with monitoring a USS. Even worse, the UE may lack sufficient processing capability such that signals transmitted within one of the CSS or the USS are not received and/or not decoded. This wastes spectrum and network overhead, as well as power and processing resources, because the base station will generally re-transmit, at a future time, the signals that were not received and/or not decoded.

Some techniques and apparatuses described herein enable a UE (e.g., UE 120) to refrain from monitoring a USS that is at least partially included in a first zone of symbols at or before a CSS and/or a second zone of symbols at or after the CSS. Additionally, or alternatively, the UE 120 may monitor, according to one or more modifications and/or conditions, a USS that is at least partially included in a first zone of symbols at or before a CSS and/or a second zone of symbols at or after the CSS. As a result, the UE 120 conserves power and processing resources. Additionally, in some aspects, the UE 120 prevents the wasting of spectrum and other network resources when the UE 120 lacks sufficient processing power to monitor, and decode signals within, both the USS and the CSS. Similarly, techniques and apparatuses described herein enable a base station (e.g., base station 110) to refrain from transmitting within a USS that is at least partially included in a first zone of symbols at or before a CSS and/or a second zone of symbols at or after the CSS. Additionally, or alternatively, the base station 110 may transmit, according to one or more modifications and/or conditions, within a USS that is at least partially included in a first zone of symbols at or before a CSS and/or a second zone of symbols at or after the CSS. As a result, the base station 110 conserves power and network overhead. Additionally, in some aspects, the base station 110 conserves spectrum and other network resources when the UE 120 lacks sufficient processing power to monitor, and decode signals within, both the USS and the CSS.

As indicated above, FIG. 3 is provided as an example. Other examples may differ from what is described with respect to FIG. 3.

Figure 4A:
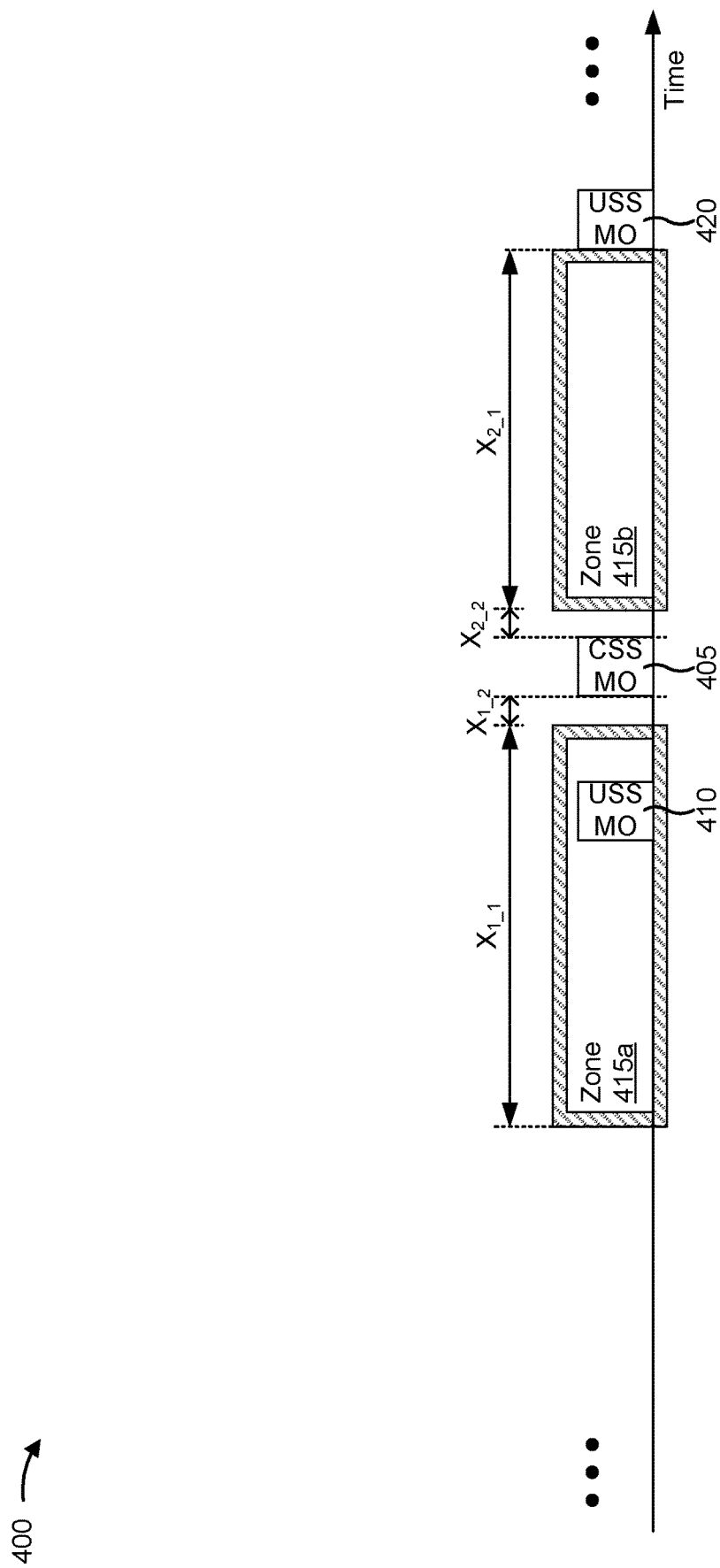
FIGS. 4A and 4B are diagrams illustrating examples associated with monitoring other search spaces near a CSS, in accordance with the present disclosure.

FIG. 4A is a diagram illustrating an example 400 associated with monitoring other search spaces near a CSS, in accordance with the present disclosure. As shown in FIG. 4A, example 400 includes a scheduled CSS 405 associated with a base station (e.g., base station 110). Accordingly, a UE (e.g., UE 120) served by a cell including the base station 110 may monitor the CSS 405 (e.g., to receive broadcast signals). The CSS 405 may include a Type0-PDCCH CSS, a Type0A-PDCCH CSS, a Type1-PDCCH CSS, a Type2-PDCCH CSS, and/or another CSS.

The CSS 405 may be part of a subset from a set of CSSs. For example, the base station 110 may configure a set of CSSs, where different subsets of the set are associated with different SSB indices. Accordingly, in some aspects, the base station 110 may transmit, and the UE 120 may receive, an indication of the subset from the set of CSSs. For example, the base station 110 may transmit, and the UE 120 may receive, an RRC message, a medium access control (MAC) control element (MAC-CE), and/or downlink control information (DCI) including the indication. The indication may include a periodicity associated with the subset (e.g., a period represented by M such that the UE 120 monitors the CSS 405 every $M^{th}$ slot), an offset associated with the subset (e.g., an offset with reference to an SSB and/or a different CSS), an SSB index associated with the subset, a transmission configuration indicator (TCI) state associated with the subset, or a combination thereof.

A TCI state may indicate a directionality or a characteristic of a downlink beam, such as one or more quasi-colocation (QCL) properties of the downlink beam. For example, a QCL property may be indicated using a qcl-Type indicator within a QCL-Info data structure, as defined in 3GPP specifications and/or another standard. A QCL property may include, for example, a Doppler shift, a Doppler spread, an average delay, a delay spread, or spatial receive parameters, among other examples. In some aspects, a TCI state may be further associated with an antenna port, an antenna panel, and/or a TRP. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). For example, the downlink reference signal may be indicated using a referenceSignal indicator within a QCL-Info data structure, as defined in 3GPP specifications and/or another standard. In cases where the QCL type indicates spatial receive parameters, the QCL type may correspond to analog receive beamforming parameters of a UE receive beam at the UE 120.

In some aspects, the UE 120 may transmit, and the base station 110 may receive, an indication of a preferred subset from the set of CSSs. For example, the UE 120 may measure a plurality of SSBs and/or other reference signals associated with different subsets and select the preferred subset based at least in part on the measuring. The UE 120 may select the subset associated with one or more strongest measurements as the preferred subset. In some aspects, the UE 120 may transmit, and the base station 110 may receive, a UE capability message (e.g., a UECapabilityInformation data structure, as defined in 3GPP specifications and/or another standard), a different RRC message, a MAC-CE, and/or uplink control information (UCI) including the indication. Accordingly, the base station 110 may indicate the subset based at least in part on the preferred subset.

Additionally, or alternatively, the UE 120 may determine the subset, based at least in part on one or more rules (e.g., stored in a memory of the UE 120). For example, the UE 120 may be programmed (and/or otherwise preconfigured) with rule(s) that use measurements (e.g., of a plurality of SSBs and/or other reference signals associated with different subsets) and/or physical properties (e.g., associated with different beams used by the base station 110) as input and that output the subset to use. In some aspects, the base station 110 may transmit, and the UE 120 may receive, an indication of which rule from a plurality of rules to use to determine the subset. Similarly, the base station 110 may also determine the subset, based at least in part on one or more rules (e.g., stored in a memory of the base station 110).

In some aspects, the subset may be associated with an activation command (e.g., a MAC-CE from the base station 110) that is associated with a TCI state of an active bandwidth part (BWP) that includes an initial CORESET (e.g., Type0-PDCCH CORESET, also referred to as "CORESET 0"). As used herein, "bandwidth part" or "BWP" may refer to a contiguous set of physical resource blocks (PRBs), where each PRB includes a set of frequencies corresponding to one or more subcarriers. A "subcarrier" may refer to a frequency based at least in part on a "carrier" frequency, and subcarriers may be aggregated to convey information wirelessly (e.g., using OFDM symbols and/or other RF symbols).

Additionally, or alternatively, the subset may be associated with an activation command (e.g., a MAC-CE from the base station 110) that is associated with a TCI state for a CORESET associated with the scheduled CSS 405. For example, the activation command may be associated with a Type0A-PDCCH CORESET, a Type1-PDCCH CORESET, a Type2-PDCCH CORESET, and/or another CORESET associated with the scheduled CSS 405.

Additionally, or alternatively, the subset may be associated with an SSB that is associated with a random access procedure from the UE 120. For example, the UE 120 may have initiated a random access procedure with the base station 110 based at least in part on one or more measurements of the SSB (e.g., by transmitting a random access preamble to the base station 110 on a random access channel occasion associated with the SSB). Accordingly, the subset may be associated with that SSB.

Additionally, or alternatively, the subset may be associated with an SSB that is associated with a set of TCI states configured for the UE 120. For example, the base station 110 may transmit, and the UE 120 may receive, an RRC message (e.g., including a tci-StatesToAddModList table, as defined in 3GPP specifications and/or another standard) that configures the set of TCI states for the UE 120. Accordingly, the subset may be associated with one or more TCI states from the set. The TCI state(s) may be associated with one or more lowest indices (e.g., as indicated according to the tci-StatesToAddModList table) and/or may be associated with CORESET(s) that are associated with one or more lowest indices (e.g., as indicated according to one or more ControlResourceSet data structures, as defined in 3GPP specifications and/or another standard).

Additionally, or alternatively, the subset may be associated with an SSB that is associated with a set of activated TCI states for the active BWP. For example, the base station 110 may transmit, and the UE 120 may receive, a MAC-CE that activates one or more TCI states such that the active BWP is associated with the set of activated TCI states. Accordingly, the subset may be associated with one or more TCI states from the set. The TCI state(s) may be associated with one or more lowest indices (e.g., as indicated according to a tci-StatesToAddModList table and/or the activation MAC-CE) and/or may be associated with CORESET(s) that are associated with one or more lowest indices (e.g., as indicated according to one or more ControlResourceSet data structures, as defined in 3GPP specifications and/or another standard).

Additionally, or alternatively, the subset may be associated with a unified TCI state (e.g., as defined in 3GPP specifications and/or another standard) configured for the UE 120. For example, the base station 110 may indicate the unified TCI state to the UE 120 to use commonly for a control channel, a data channel, and at least one reference signal (e.g., a CSI-RS).

The subset may be associated with a most recent of any of the events described above. Accordingly, in some aspects, the rule(s) may indicate that the UE 120 (and the base station 110) should select the subset associated with a most recent of one or more of the events described above.

As further shown in FIG. 4A, the UE 120 may determine a first zone 415a that includes one or more symbols at or before the scheduled CSS 405, a second zone 415b that includes one or more symbols at or after the scheduled CSS 405, or a combination thereof. Similarly, the base station 110 may determine the first zone 415a at or before the scheduled CSS 405, the second zone 415b at or after the scheduled CSS 405, or the combination thereof.

As shown in FIG. 4A, the first zone 415a may include a first quantity of symbols (represented by $X_{1\_1}$ symbols in example 400) before the CSS 405. Additionally, or alternatively, the first zone 415a may exclude a second quantity of symbols (represented by $X_{1\_2}$ symbols in example 400) before the CSS 405. The first zone 415a may therefore begin $X_{1\_1}+X_{1\_2}$ symbols before the CSS 405 and end $X_{1\_2}$ symbols before the CSS 405. In some aspects, the second quantity may be zero (e.g., $X_{1\_2}=0$) symbols. Similarly, the second zone 415b may include a third quantity of symbols (represented by $X_{2\_1}$ symbols in example 400). Additionally, or alternatively, the second zone 415b may exclude a fourth quantity of symbols (represented by $X_{2\_2}$ symbols in example 400). The second zone 415b may therefore begin $X_{2\_2}$ symbols after an end of the CSS 405 and end $X_{2\_1}+X_{2\_2}$ symbols after the end of the CSS 405. In some aspects, the fourth quantity may be zero (e.g., $X_{2\_2}=0$) symbols.

In some aspects, the base station 110 may transmit, and the UE 120 may receive, an indication of the first quantity, the second quantity, the third quantity, and/or the fourth quantity. For example, the base station 110 may transmit an RRC message, a MAC-CE, and/or DCI including the indication.

In some aspects, the UE 120 may transmit, and the base station 110 may receive, an indication of a preferred first quantity of symbols included in the first zone, a preferred second quantity of symbols excluded from the first zone, a preferred third quantity of symbols included in the second zone, and/or a preferred fourth quantity of symbols excluded from the second zone. For example, the UE 120 may determine larger preferred first quantities and/or preferred third quantities when the UE 120 has fewer processing resources and/or antennas for monitoring, and decoding signals within, other search spaces near the CSS 405. Similarly, the UE 120 may determine smaller preferred second quantities and/or preferred fourth quantities when the UE 120 has fewer processing resources and/or antennas for monitoring, and decoding signals within, other search spaces that at least partially overlap with the CSS 405. In some aspects, the UE 120 may transmit, and the base station 110 may receive, a UE capability message, a different RRC message, a MAC-CE, and/or UCI including the indication. Accordingly, the base station 110 may indicate the first quantity, the second quantity, the third quantity, and/or the fourth quantity, based at least in part on the preferred first quantity, the preferred second quantity, the preferred third quantity, and/or the preferred fourth quantity, respectively.

Additionally, or alternatively, the UE 120 may determine the first quantity, the second quantity, the third quantity, and/or the fourth quantity, based at least in part on one or more rules (e.g., stored in a memory of the UE 120). For example, the UE 120 may be programmed (and/or otherwise preconfigured) with rule(s) that use UE capabilities (e.g., a measure of processing resources for the UE 120, a quantity of antennas included in the UE 120, and/or another hardware- or software-based capability) as input and that output the first quantity, the second quantity, the third quantity, and/or the fourth quantity to use. In some aspects, the base station 110 may transmit, and the UE 120 may receive, an indication of which rule from a plurality of rules to use to determine the subset. Additionally, or alternatively, the UE 120 may determine one or more of the first quantity, the second quantity, the third quantity, or the fourth quantity, and the base station 110 may indicate the remaining of the first quantity, the second quantity, the third quantity, or the fourth quantity. For example, the UE 120 may determine zero as the second quantity and/or the fourth quantity when the base station 110 does not indicate the second quantity and/or the fourth quantity, respectively. Similarly, the base station 110 may determine the first quantity, the second quantity, the third quantity, and/or the fourth quantity, based at least in part on one or more rules (e.g., stored in a memory of the base station 110).

Accordingly, as shown in FIG. 4A, the UE 120 may refrain from monitoring a USS 410 at least partially included in the first zone 415a. Additionally, or alternatively, the UE 120 may refrain from monitoring a USS 410 at least partially included in the second zone 415b or a combination of the first zone 415a and the second zone 415b. Similarly, the base station 110 may refrain from transmitting within the USS 410 at least partially included in the first zone 415a. Additionally, or alternatively, the base station 110 may refrain from transmitting within a USS 410 at least partially included in the second zone 415b or a combination of the first zone 415a and the second zone 415b.

Additionally, or alternatively, the UE 120 may monitor the USS 410 at least partially included in the first zone 415a (or at least partially included in the second zone 415b or a combination thereof), and the base station 110 may similarly transmit within the USS 410 at least partially included in the first zone 415a (or at least partially included in the second zone 415b or a combination thereof). For example, the UE 120 may monitor, and the base station 110 may transmit within, the USS 410 according to one or more modifications and/or conditions.

In some aspects, the UE 120 may monitor, and the base station 110 may transmit within, the USS 410 according to a lower quantity of candidates. As used herein, "candidate" may refer to a possible location (e.g., within frequency and/or time) for a PDCCH transmission with the USS 410. Accordingly, the UE 120 may only monitor a portion of frequencies and/or symbols within the USS 410 when the USS 410 is at least partially included in the first zone 415*a* (or at least partially included in the second zone 415*b* or a combination thereof). Similarly, the base station 110 may only transmit in that portion of frequencies and/or symbols. Additionally, or alternatively, the UE 120 may monitor, and the base station 110 may transmit within, the USS 410 according to a lower quantity of formats. For example, the UE 120 may only monitor for, and the base station 110 may only transmit, DCI formats 0_0, 1_0, 2_0, 2_1, 2_2, and/or 2_3, as defined in 3GPP specifications and/or another standard. Accordingly, the UE 120 may only monitor for formats that are associated with a maximum size that satisfies a size threshold and/or that are associated with a processing complexity that satisfies a processing constraint. Additionally, or alternatively, the UE 120 may monitor, and the base station 110 may transmit within, the USS 410 according to a lower quantity of control channel elements (CCEs). As used herein, "control channel element" or "CCE" may refer to a set of resource element groups (REGs), such as nine consecutive REGs, where each REG includes a plurality of resource elements (REs), such as four consecutive REs. Each RE may include one symbol and one subcarrier. Accordingly, the UE 120 may only monitor a portion of CCEs within the USS 410 when the USS 410 is at least partially included in the first zone 415*a* (or at least partially included in the second zone 415*b* or a combination thereof). Similarly, the base station 110 may only transmit in that portion of CCEs.

Additionally, or alternatively, the UE 120 may monitor, and the base station 110 may transmit within, the USS 410 when a format associated with the USS 410 is selected from one or more acceptable formats. For example, as described above, the UE 120 may only monitor for, and the base station 110 may only transmit, DCI formats 0_0, 1_0, 2_0, 2_1, 2_2, and/or 2_3, as defined in 3GPP specifications and/or another standard. In some aspects, the base station 110 may transmit, and the UE 120 may receive, an indication of the one or more acceptable formats (e.g., via an RRC message, a MAC-CE, and/or DCI). In some aspects, the UE 120 may transmit, and the base station 110 may receive, an indication of one or more preferred acceptable formats (e.g., via a UE capability message, a different RRC message, a MAC-CE, and/or UCI), such that the indication of the one or more acceptable formats is based at least in part on the one or more preferred acceptable formats. For example, the UE 120 may determine fewer preferred acceptable formats when the UE 120 has fewer processing resources and/or antennas for monitoring, and decoding signals within, the USS 410. Additionally, or alternatively, the UE 120 and/or the base station 110 may determine the one or more acceptable formats according to one or more stored rules.

Additionally, or alternatively, the UE 120 may monitor, and the base station 110 may transmit within, the USS 410 when a beam associated with the USS 410 is a same beam associated with the CSS 405. For example, the UE 120 may monitor, and the base station 110 may transmit within, the USS 410 when the USS 410 is associated with a same QCL-TypeD property (e.g., as defined in 3GPP specifications and/or another standard) as the CSS 405. Accordingly, the UE 120 may use a same UE receive beam to monitor both the USS 410 and the CSS 405.

When the UE 120 monitors, and the base station 110 transmits within, the USS 410, the UE 120 and the base station 110, respectively, may modify a length associated with the first zone 415*a*, a position associated with the first zone 415*a*, a length associated with the second zone 415*b*, a position associated with the second zone 415*b*, or a combination thereof. For example, the UE 120 and the base station 110 may increase a length of the first zone 415*a* such that other USSs near the USS 410 are not monitored (or are monitored according to one or more modifications and/or conditions as described above), which causes the UE 120 to conserve resources. Additionally, or alternatively, the first zone 415*a* may be moved closer to the CSS 405 (e.g., by reducing the second quantity represented by $X_{1\_2}$) such that other USSs that were near the CSS 405 but not within the original first zone 415*a* are not monitored (or are monitored according to one or more modifications and/or conditions as described above), which causes the UE 120 to conserve resources.

Similarly, the UE 120 and the base station 110 may increase a length of the second zone 415*b* such that other USSs after the CSS 405 are not monitored (or are monitored according to one or more modifications and/or conditions as described above), which allows the UE 120 to allocate power and processing resources to decoding signals received within the USS 410 as well as the CSS 405. Accordingly, the USS 420, which would have been outside the second zone 415*b* and thus monitored as usual by the UE 120 and transmitted as usual by the base station 110, may be included in the modified second zone 415*b*. Thus, the UE 120 may not monitor the USS 420 (or may monitor the USS 420 according to one or more modifications and/or conditions as described above). Additionally, or alternatively, the second zone 415*b* may be moved closer to the CSS 405 (e.g., by reducing the fourth quantity represented by $X_{2\_2}$) such that other USSs that were near the CSS 405 but not within the original second zone 415*b* are not monitored (or are monitored according to one or more modifications and/or conditions as described above), which causes the UE 120 to conserve resources.

Figure 4B:
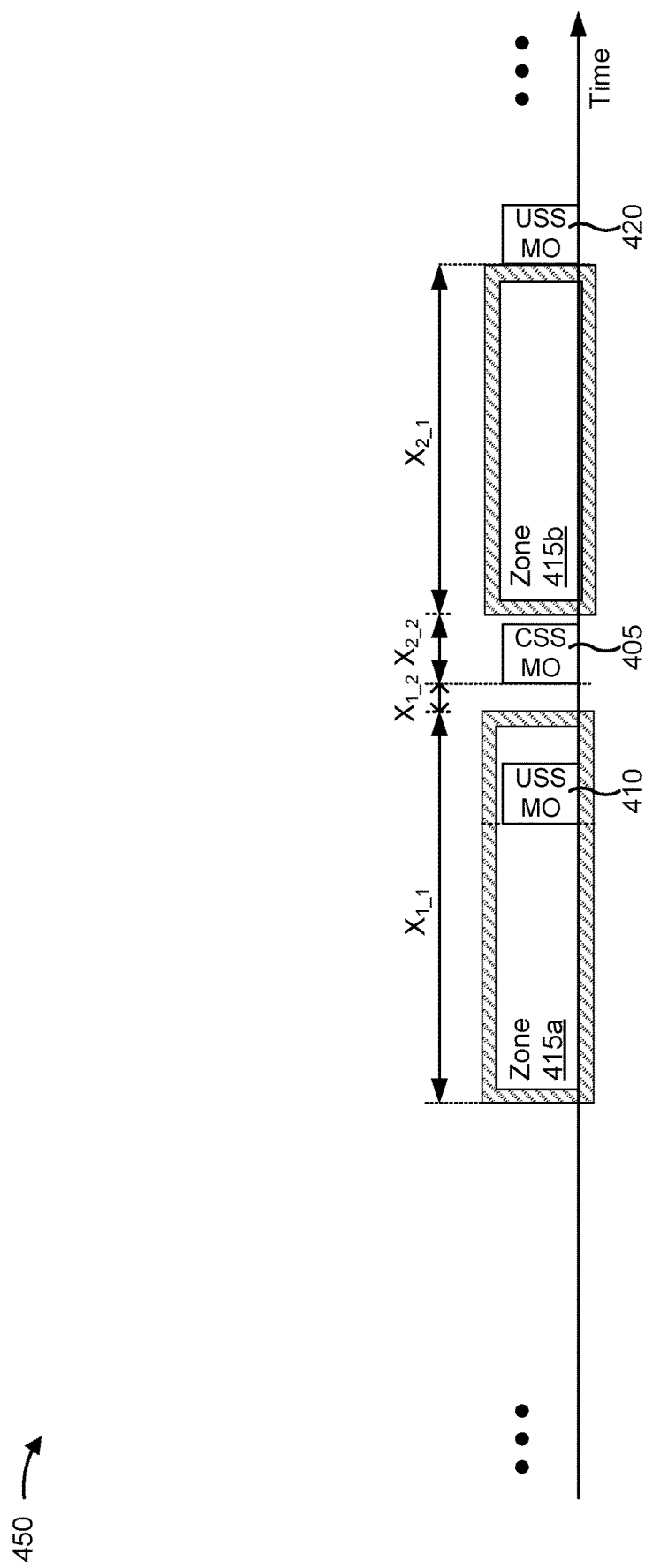

FIG. 4B is a diagram illustrating an example 450 associated with monitoring other search spaces near a CSS, in accordance with the present disclosure. Example 450 is similar to example 400 of FIG. 4A except that the second zone 415*b* excludes a fourth quantity of symbols (represented by $X_{2\_2}$ symbols in example 450) starting at the CSS 405 rather than after the CSS 405. Accordingly, the second zone 415*b* begins $X_{2\_2}$ symbols after a beginning of the CSS 405 and ends $X_{2\_1} + X_{2\_2}$ symbols after the beginning of the CSS 405.

By using techniques as described in connection with FIG. 4A and/or FIG. 4B, the UE 120 may refrain from monitoring the USS 410 that is at least partially included in the first zone 415*a* of symbols at or before the CSS 405 and/or the second zone 415*b* of symbols at or after the CSS 405. Additionally, or alternatively, the UE 120 may monitor, according to one or more modifications and/or conditions as described above, the USS 410 that is at least partially included in the first zone 415*a* and/or the second zone 415*b*. As a result, the UE 120 conserves power and processing resources. Additionally, in some aspects, the UE 120 prevents the wasting of spectrum and other network resources when the UE 120 lacks sufficient processing power to monitor, and decode signals within, both the USS 410 and the CSS 405.

Similarly, by using techniques as described in connection with FIG. 4A and/or FIG. 4B, the base station 110 may refrain from transmitting within the USS 410 that is at least partially included in the first zone 415a of symbols at or before the CSS 405 and/or the second zone 415b of symbols at or after the CSS 405. Additionally, or alternatively, the base station 110 may transmit, according to one or more modifications and/or conditions as described above, within the USS 410 that is at least partially included in the first zone 415a and/or the second zone 415b. As a result, the base station 110 conserves power and network overhead. Additionally, in some aspects, the base station 110 conserves spectrum and other network resources when the UE 120 lacks sufficient processing power to monitor, and decode signals within, both the USS 410 and the CSS 405.

As indicated above, FIGS. 4A and 4B are provided as examples. Other examples may differ from what is described with respect to FIGS. 4A-4B.

Figure 5:
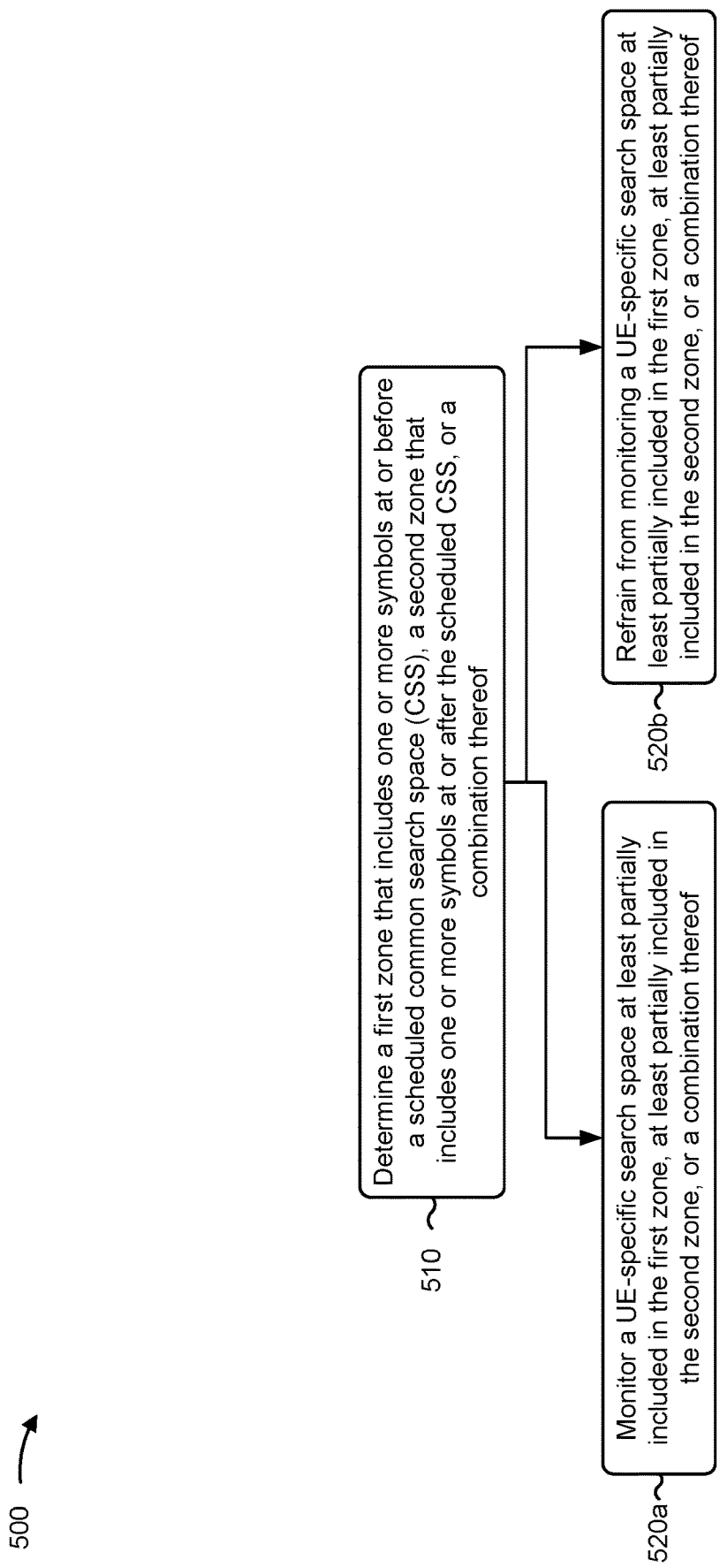
FIGS. 5 and 6 are diagrams illustrating example processes associated with monitoring other search spaces near a CSS, in accordance with the present disclosure.

FIG. 5 is a diagram illustrating an example process 500 performed, for example, by a UE, in accordance with the present disclosure. Example process 500 is an example where the UE (e.g., UE 120 and/or apparatus 700 of FIG. 7) performs operations associated with monitoring other search spaces near a CSS.

As shown in FIG. 5, in some aspects, process 500 may include determining a first zone that includes one or more symbols at or before a scheduled CSS, a second zone that includes one or more symbols at or after the scheduled CSS, or a combination thereof (block 510). For example, the UE (e.g., using determination component 708, depicted in FIG. 7) may determine a first zone that includes one or more symbols at or before a scheduled CSS, a second zone that includes one or more symbols at or after the scheduled CSS, or a combination thereof, as described above.

As further shown in FIG. 5, in some aspects, process 500 may include monitoring a USS at least partially included in the first zone, at least partially included in the second zone, or a combination thereof (block 520a). For example, the UE (e.g., using monitoring component 710, depicted in FIG. 7) may monitor a USS at least partially included in the first zone, at least partially included in the second zone, or a combination thereof, as described above. Additionally, or alternatively, process 500 may include refraining from monitoring a USS at least partially included in the first zone, at least partially included in the second zone, or a combination thereof (block 520b). For example, the UE (e.g., using monitoring component 710) may refrain from monitoring a USS at least partially included in the first zone, at least partially included in the second zone, or a combination thereof, as described above.

Process 500 may include additional aspects, such as any single aspect or any combination of aspects described below and/or in connection with one or more other processes described elsewhere herein.

In a first aspect, the first zone includes a first quantity of symbols.

In a second aspect, alone or in combination with the first aspect, the first zone excludes a second quantity of symbols before the scheduled CSS.

In a third aspect, alone or in combination with one or more of the first and second aspects, process 500 includes further receiving (e.g., using reception component 702, depicted in FIG. 7), from a base station, an indication of the first quantity of symbols, the second quantity of symbols, or a combination thereof.

In a fourth aspect, alone or in combination with one or more of the first through third aspects, the indication, of the first quantity of symbols, the second quantity of symbols, or a combination thereof, is included in an RRC message, a MAC-CE, or DCI.

In a fifth aspect, alone or in combination with one or more of the first through fourth aspects, process 500 further includes transmitting (e.g., using transmission component 704, depicted in FIG. 7), to the base station, an indication of a preferred first quantity of symbols included in the first zone, a preferred second quantity of symbols excluded from the first zone, or a combination thereof, such that the indication from the base station is based at least in part on the preferred first quantity of symbols, the preferred second quantity of symbols, or the combination thereof.

In a sixth aspect, alone or in combination with one or more of the first through fifth aspects, the indication, of the preferred first quantity of symbols included in the first zone, the preferred second quantity of symbols excluded from the first zone, or a combination thereof, to the base station is included in a UE capability report, an RRC message, a MAC-CE, or UCI.

In a seventh aspect, alone or in combination with one or more of the first through sixth aspects, process 500 further includes determining (e.g., using determination component 708), using one or more rules stored in a memory of the UE, the first quantity of symbols, the second quantity of symbols, or a combination thereof.

In an eighth aspect, alone or in combination with one or more of the first through seventh aspects, the second zone includes a third quantity of symbols.

In a ninth aspect, alone or in combination with one or more of the first through eighth aspects, the second zone excludes a fourth quantity of symbols after the scheduled CSS.

In a tenth aspect, alone or in combination with one or more of the first through ninth aspects, process 500 further includes receiving (e.g., using reception component 702), from a base station, an indication of the third quantity of symbols, the fourth quantity of symbols, or a combination thereof.

In an eleventh aspect, alone or in combination with one or more of the first through tenth aspects, the indication, of the third quantity of symbols, the fourth quantity of symbols, or a combination thereof, is included in an RRC message, a MAC-CE, or DCI.

In a twelfth aspect, alone or in combination with one or more of the first through eleventh aspects, process 500 further includes transmitting (e.g., using transmission component 704), to the base station, an indication of a preferred third quantity of symbols included in the second zone, a preferred fourth quantity of symbols excluded from the second zone, or a combination thereof, such that the indication from the base station is based at least in part on the preferred third quantity of symbols, the preferred fourth quantity of symbols, or the combination thereof.

In a thirteenth aspect, alone or in combination with one or more of the first through twelfth aspects, the indication, of the preferred third quantity of symbols included in the second zone, the preferred fourth quantity of symbols excluded from the second zone, or a combination thereof, to the base station is included in a UE capability report, an RRC message, a MAC-CE, or UCI.

In a fourteenth aspect, alone or in combination with one or more of the first through thirteenth aspects, process 500 further includes determining (e.g., using determination component 708), using one or more rules stored in a memory of the UE, the third quantity of symbols, the fourth quantity of symbols, or a combination thereof.

In a fifteenth aspect, alone or in combination with one or more of the first through fourteenth aspects, the USS is not monitored, based at least in part on the USS being at least partially included in the first zone or the second zone.

In a sixteenth aspect, alone or in combination with one or more of the first through fifteenth aspects, the USS is monitored with a lower quantity of candidates, formats, control channel elements, or a combination thereof, based at least in part on the USS being at least partially included in the first zone or the second zone.

In a seventeenth aspect, alone or in combination with one or more of the first through sixteenth aspects, the USS is monitored when a format associated with the USS is selected from one or more acceptable formats, based at least in part on the USS being at least partially included in the first zone or the second zone.

In an eighteenth aspect, alone or in combination with one or more of the first through seventeenth aspects, the USS is monitored when a beam associated with the USS is a same beam associated with the CSS, based at least in part on the USS being at least partially included in the first zone or the second zone.

In a nineteenth aspect, alone or in combination with one or more of the first through eighteenth aspects, process 500 further includes modifying (e.g., using determination component 708) a length associated with the first zone, a position associated with the first zone, a length associated with the second zone, a position associated with the second zone, or a combination thereof, based at least in part on monitoring the USS.

In a twentieth aspect, alone or in combination with one or more of the first through nineteenth aspects, process 500 further includes receiving (e.g., using reception component 702), from a base station, an indication of a subset from a set of CSSs, where the scheduled CSS is included in the subset.

In a twenty-first aspect, alone or in combination with one or more of the first through twentieth aspects, the indication, of the subset from the set of CSSs, is included in an RRC message, a MAC-CE, or DCI.

In a twenty-second aspect, alone or in combination with one or more of the first through twenty-first aspects, the indication includes a periodicity associated with the subset, an offset associated with the subset, an SSB index associated with the subset, a TCI state associated with the subset, or a combination thereof.

In a twenty-third aspect, alone or in combination with one or more of the first through twenty-second aspects, process 500 further includes transmitting (e.g., using transmission component 704), to the base station, an indication of a preferred subset from the set of CSSs, such that the indication from the base station is based at least in part on the preferred subset.

In a twenty-fourth aspect, alone or in combination with one or more of the first through twenty-third aspects, the indication, of the preferred subset from the set of CSSs, to the base station is included in a UE capability report, an RRC message, a MAC-CE, or UCI.

In a twenty-fifth aspect, alone or in combination with one or more of the first through twenty-fourth aspects, process 500 further includes determining (e.g., using determination component 708) a subset from a set of CSSs, where the scheduled CSS is included in the subset.

In a twenty-sixth aspect, alone or in combination with one or more of the first through twenty-fifth aspects, the subset is associated with at least one of an activation command associated with a TCI state of an active BWP that includes an initial CORESET, an activation command associated with a TCI state for a CORESET associated with the scheduled CSS, an SSB associated with a random access procedure from the UE, an SSB associated with a set of TCI states configured for the UE, an SSB associated with a set of activated TCI states for the active BWP, or a unified TCI state configured for the UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
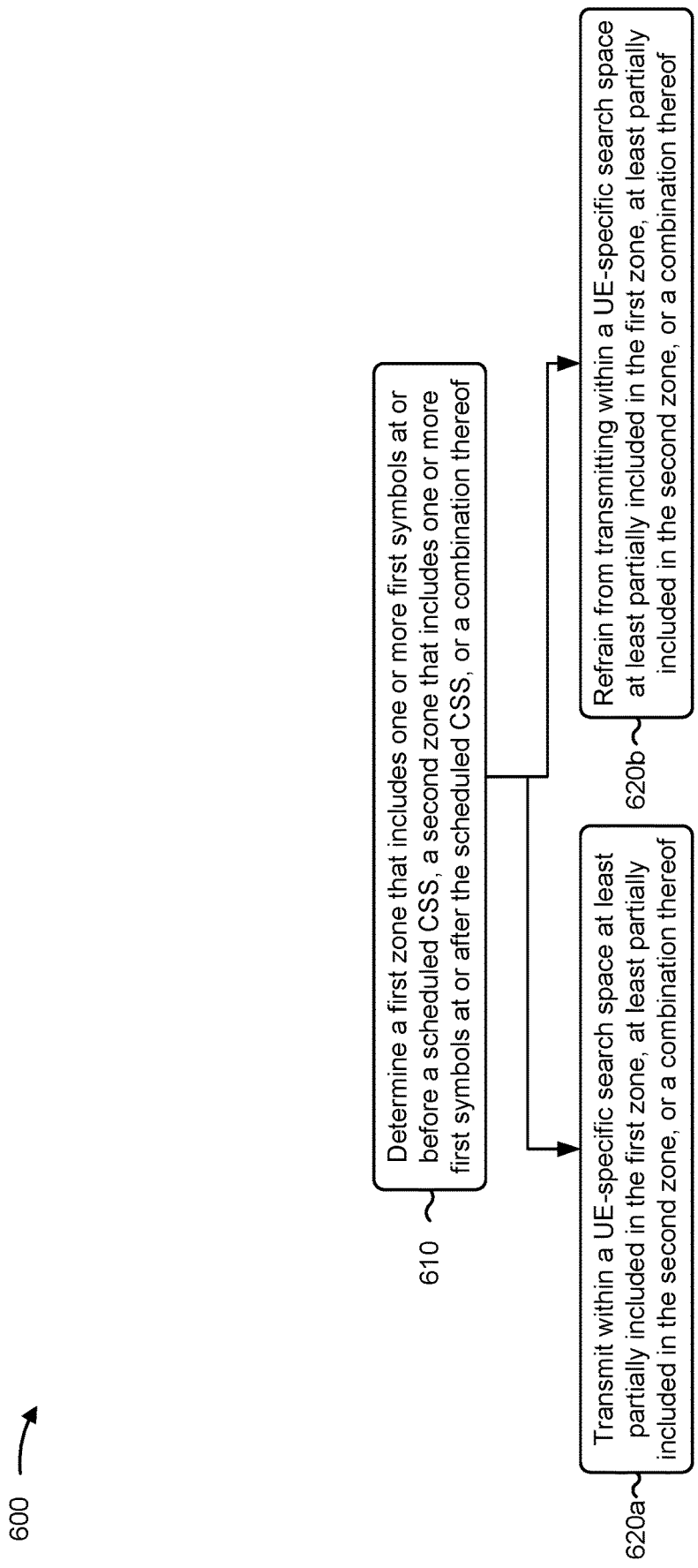

FIG. 6 is a diagram illustrating an example process 600 performed, for example, by a base station, in accordance with the present disclosure. Example process 600 is an example where the base station (e.g., base station 110 and/or apparatus 800 of FIG. 8) performs operations associated with monitoring other search spaces near a CSS.

As shown in FIG. 6, in some aspects, process 600 may include determining, for a UE (e.g., UE 120 and/or apparatus 700 of FIG. 7), a first zone that includes one or more first symbols at or before a scheduled CSS, a second zone that includes one or more first symbols at or after the scheduled CSS, or a combination thereof (block 610). For example, the base station (e.g., using determination component 808, depicted in FIG. 8) may determine a first zone that includes one or more first symbols at or before a scheduled CSS, a second zone that includes one or more first symbols at or after the scheduled CSS, or a combination thereof, as described above.

As further shown in FIG. 6, in some aspects, process 600 may include transmitting within a USS at least partially included in the first zone, at least partially included in the second zone, or a combination thereof (block 620a). For example, the base station (e.g., using transmission component 804, depicted in FIG. 8) may transmit within a USS at least partially included in the first zone, at least partially included in the second zone, or a combination thereof, as described above. Additionally, or alternatively, process 600 may include refraining from transmitting within a USS at least partially included in the first zone, at least partially included in the second zone, or a combination thereof (block 620b). For example, the base station (e.g., using transmission component 804) may refrain from transmitting within a USS at least partially included in the first zone, at least partially included in the second zone, or a combination thereof, as described above.

Process 600 may include additional aspects, such as any single aspect or any combination of aspects described below and/or in connection with one or more other processes described elsewhere herein.

In a first aspect, the first zone includes a first quantity of symbols.

In a second aspect, alone or in combination with the first aspect, the first zone excludes a second quantity of symbols before the scheduled CSS.

In a third aspect, alone or in combination with one or more of the first and second aspects, process 600 further includes transmitting (e.g., using transmission component 804), to the UE, an indication of the first quantity of symbols, the second quantity of symbols, or a combination thereof.

In a fourth aspect, alone or in combination with one or more of the first through third aspects, the indication, of the first quantity of symbols, the second quantity of symbols, or a combination thereof, is included in an RRC message, a MAC-CE, or DCI.

In a fifth aspect, alone or in combination with one or more of the first through fourth aspects, process 600 further includes receiving (e.g., using reception component 802, depicted in FIG. 8), from the UE, an indication of a preferred first quantity of symbols included in the first zone, a preferred second quantity of symbols excluded from the first zone, or a combination thereof, such that the indication to the UE is based at least in part on the preferred first quantity of symbols, the preferred second quantity of symbols, or the combination thereof.

In a sixth aspect, alone or in combination with one or more of the first through fifth aspects, the indication, of the preferred first quantity of symbols included in the first zone, the preferred second quantity of symbols excluded from the first zone, or a combination thereof, from the UE is included in a UE capability report, an RRC message, a MAC-CE, or UCI.

In a seventh aspect, alone or in combination with one or more of the first through sixth aspects, process 600 further includes determining (e.g., using determination component 808), using one or more rules stored in a memory of the base station, the first quantity of symbols, the second quantity of symbols, or a combination thereof.

In an eighth aspect, alone or in combination with one or more of the first through seventh aspects, the second zone includes a third quantity of symbols.

In a ninth aspect, alone or in combination with one or more of the first through eighth aspects, the second zone excludes a fourth quantity of symbols after the scheduled CSS.

In a tenth aspect, alone or in combination with one or more of the first through ninth aspects, process 600 further includes transmitting (e.g., using transmission component 804), to the UE, an indication of the third quantity of symbols, the fourth quantity of symbols, or a combination thereof.

In an eleventh aspect, alone or in combination with one or more of the first through tenth aspects, the indication, of the third quantity of symbols, the fourth quantity of symbols, or a combination thereof, is included in an RRC message, a MAC-CE, or DCI.

In a twelfth aspect, alone or in combination with one or more of the first through eleventh aspects, process 600 further includes receiving (e.g., using reception component 802), from the UE, an indication of a preferred third quantity of symbols included in the second zone, a preferred fourth quantity of symbols excluded from the second zone, or a combination thereof, wherein the indication to the UE is based at least in part on the preferred third quantity, the preferred fourth quantity, or the combination thereof.

In a thirteenth aspect, alone or in combination with one or more of the first through twelfth aspects, the indication, of the preferred third quantity of symbols included in the second zone, the preferred fourth quantity of symbols excluded from the second zone, or a combination thereof, from the UE is included in a UE capability report, an RRC message, a MAC-CE, or UCI.

In a fourteenth aspect, alone or in combination with one or more of the first through thirteenth aspects, process 600 further includes determining (e.g., using determination component 808), using one or more rules stored in a memory of the base station, the third quantity of symbols, the fourth quantity of symbols, or a combination thereof.

In a fifteenth aspect, alone or in combination with one or more of the first through fourteenth aspects, the USS is not used for transmission, based at least in part on the USS being at least partially included in the first zone or the second zone.

In a sixteenth aspect, alone or in combination with one or more of the first through fifteenth aspects, the USS is used for transmission with a lower quantity of candidates, formats, control channel elements, or a combination thereof, based at least in part on the USS being at least partially included in the first zone or the second zone.

In a seventeenth aspect, alone or in combination with one or more of the first through sixteenth aspects, the USS is used for transmission when a format associated with the USS is selected from one or more acceptable formats, based at least in part on the USS being at least partially included in the first zone or the second zone.

In an eighteenth aspect, alone or in combination with one or more of the first through seventeenth aspects, the USS is used for transmission when a beam associated with the USS is a same beam associated with the CSS, based at least in part on the USS being at least partially included in the first zone or the second zone.

In a nineteenth aspect, alone or in combination with one or more of the first through eighteenth aspects, process 600 further includes modifying (e.g., using determination component 808) a length associated with the first zone, a position associated with the first zone, a length associated with the second zone, a position associated with the second zone, or a combination thereof, based at least in part on transmitting within the USS.

In a twentieth aspect, alone or in combination with one or more of the first through nineteenth aspects, process 600 further includes transmitting (e.g., using transmission component 804), to the UE, an indication of a subset from a set of CSSs, where the scheduled CSS is included in the subset.

In a twenty-first aspect, alone or in combination with one or more of the first through twentieth aspects, the indication, of the subset from the set of CSSs, is included in an RRC message, a MAC-CE, or DCI.

In a twenty-second aspect, alone or in combination with one or more of the first through twenty-first aspects, the indication includes a periodicity associated with the subset, an offset associated with the subset, an SSB index associated with the subset, a TCI state associated with the subset, or a combination thereof.

In a twenty-third aspect, alone or in combination with one or more of the first through twenty-second aspects, process 600 further includes receiving (e.g., using reception component 802), from the UE, an indication of a preferred subset from the set of CSSs, such that the indication to the UE is based at least in part on the preferred subset.

In a twenty-fourth aspect, alone or in combination with one or more of the first through twenty-third aspects, the indication, of the preferred subset from the set of CSSs, from the UE is included in a UE capability report, an RRC message, a MAC-CE, or UCI.

In a twenty-fifth aspect, alone or in combination with one or more of the first through twenty-fourth aspects, process 600 further includes determining (e.g., using determination component 808) a subset from a set of CSSs, where the scheduled CSS is included in the subset.

In a twenty-sixth aspect, alone or in combination with one or more of the first through twenty-fifth aspects, the subset is associated with at least one of an activation command associated with a TCI state of an active BWP that includes an initial CORESET, an activation command associated with a TCI state for a CORESET associated with the scheduled CSS, an SSB associated with a random access procedure from the UE, an SSB associated with a set of TCI states configured for the UE, an SSB associated with a set of activated TCI states for the active BWP, or a unified TCI state configured for the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
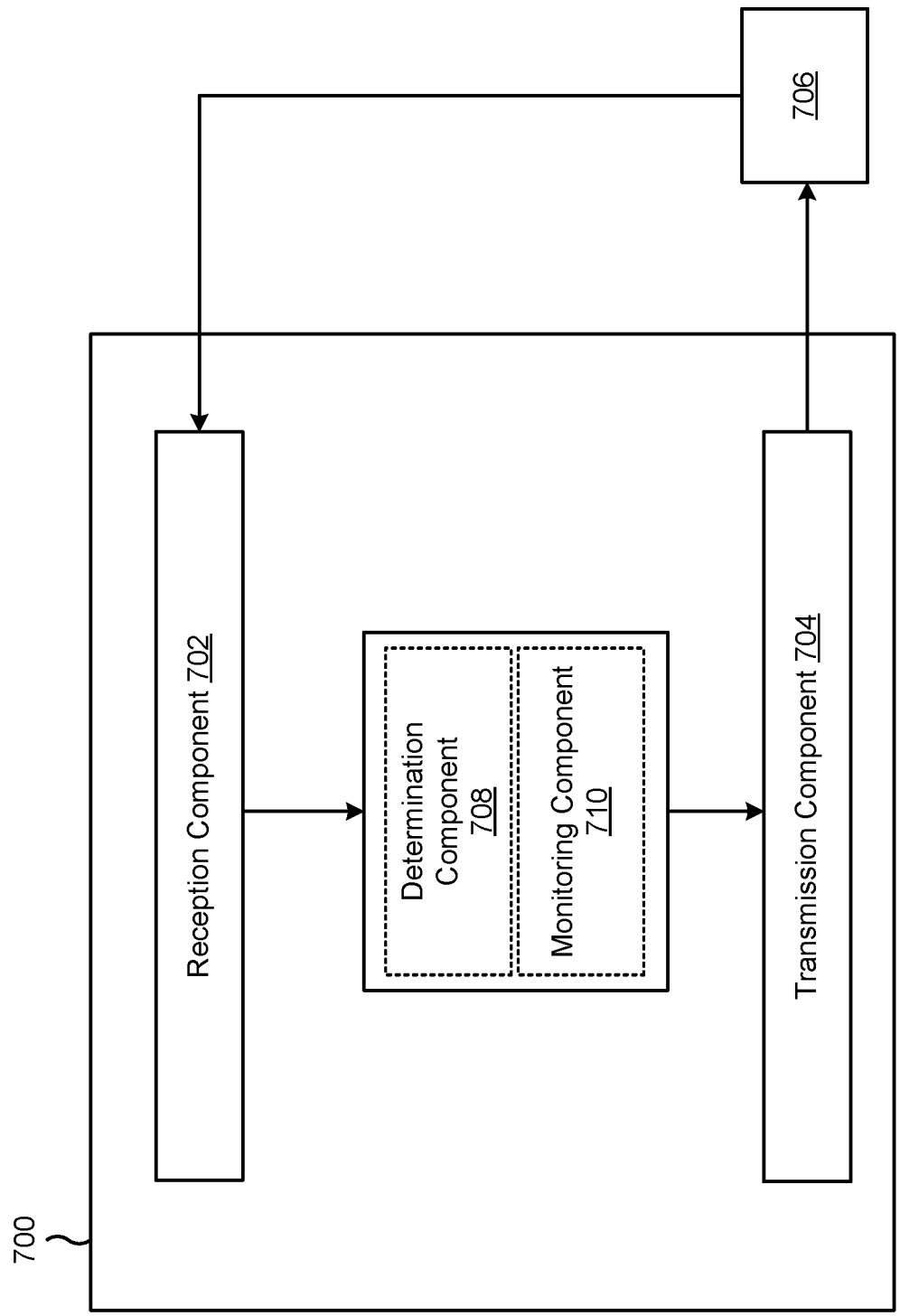
FIGS. 7 and 8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a determination component 708 or a monitoring component 710, among other examples.

In some aspects, the apparatus 700 may be configured to perform one or more operations described herein in connection with FIGS. 4A-4B. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

In some aspects, the determination component 708 may determine a first zone that includes one or more symbols at or before a scheduled CSS, a second zone that includes one or more symbols at or after the scheduled CSS, or a combination thereof. The determination component 708 may include a MIMO detector, a receive processor, a transmit MIMO processor, a transmit processor, a controller/processor, a memory, or a combination thereof, of the UE described above in connection with FIG. 2. Accordingly, the monitoring component 710 may monitor a USS at least partially included in the first zone, at least partially included in the second zone, or a combination thereof. In some aspects, the determination component 708 may modify a length associated with the first zone, a position associated with the first zone, a length associated with the second zone, a position associated with the second zone, or a combination thereof, based at least in part on monitoring the USS.

Additionally, or alternatively, the monitoring component 710 may refrain from monitoring a USS at least partially included in the first zone, at least partially included in the second zone, or a combination thereof.

The first zone may include a first quantity of symbols and/or exclude a second quantity of symbols. Accordingly, in some aspects, the reception component 702 may receive, from the apparatus 706, an indication of the first quantity of symbols, the second quantity of symbols, or a combination thereof. In some aspects, the transmission component 704 may transmit, to the apparatus 706, an indication of a preferred first quantity of symbols included in the first zone, a preferred second quantity of symbols excluded from the first zone, or a combination thereof. Accordingly, the indication, of the first quantity of symbols, the second quantity of symbols, or a combination thereof, may be based at least in part on the preferred first quantity of symbols, the preferred second quantity of symbols, or the combination thereof. Additionally, or alternatively, the determination component 708 may determine, using one or more rules stored in the apparatus 700, the first quantity of symbols, the second quantity of symbols, or a combination thereof.

Similarly, the second zone may include a third quantity of symbols and/or exclude a fourth quantity of symbols. Accordingly, in some aspects, the reception component 702 may receive, from the apparatus 706, an indication of the third quantity of symbols, the fourth quantity of symbols, or a combination thereof. In some aspects, the transmission component 704 may transmit, to the apparatus 706, an indication of a preferred third quantity of symbols included in the second zone, a preferred fourth quantity of symbols excluded from the second zone, or a combination thereof. Accordingly, the indication, of the third quantity of symbols, the fourth quantity of symbols, or a combination thereof, may be based at least in part on the preferred third quantity of symbols, the preferred fourth quantity of symbols, or the combination thereof. Additionally, or alternatively, the determination component 708 may determine, using one or more rules stored in the apparatus 700, the third quantity of symbols, the fourth quantity of symbols, or a combination thereof.

In any of the aspects described above, the reception component 702 may receive, from the apparatus 706, an indication of a subset from a set of CSSs, where the scheduled CSS is included in the subset. In some aspects, the transmission component 704 may transmit, to the apparatus 706, an indication of a preferred subset from the set of CSSs. Accordingly, the indication of the subset from the set of CSSs may be based at least in part on the preferred subset. Additionally, or alternatively, the determination component 708 may determine the subset from the set of CSSs.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
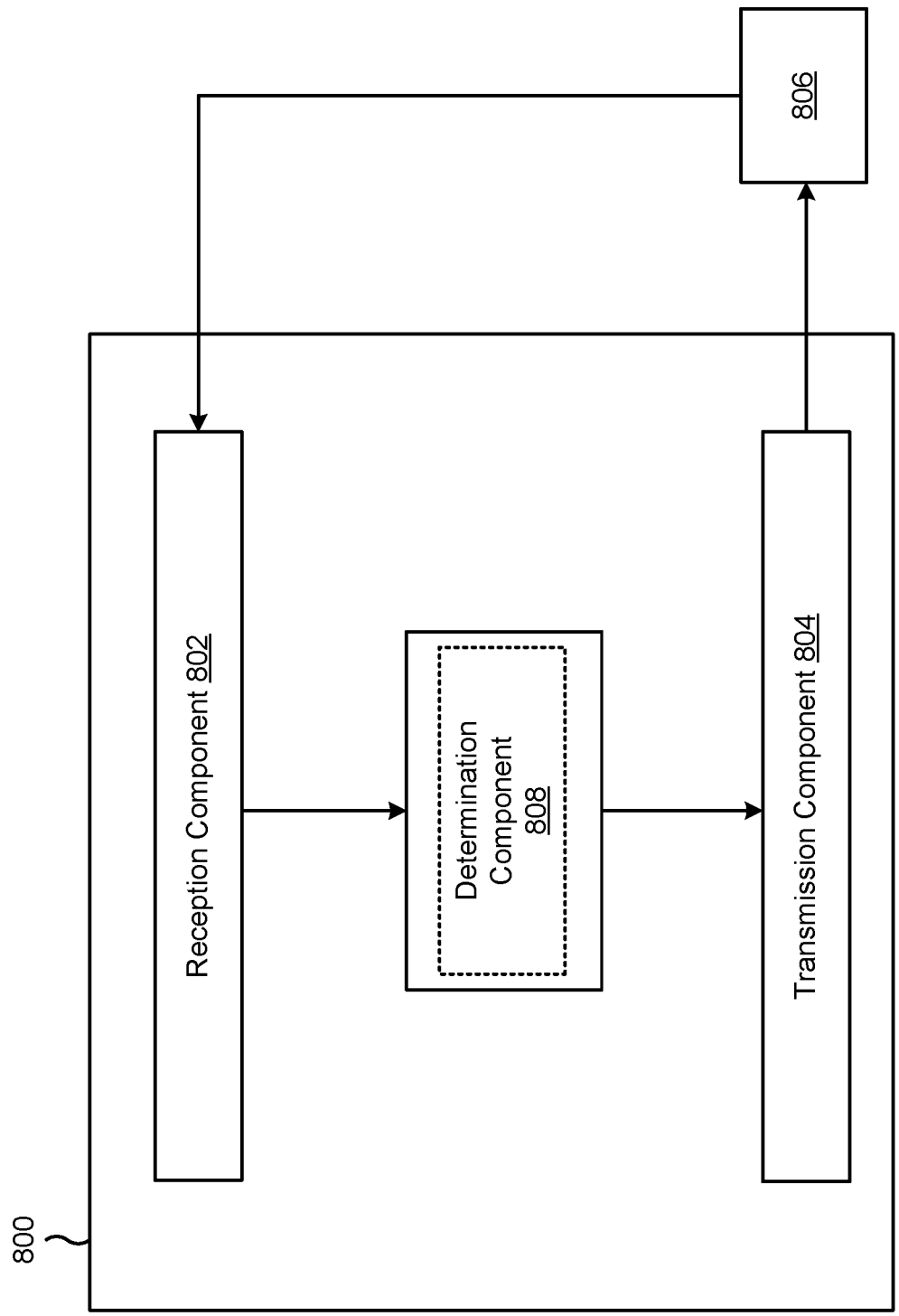

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808, among other examples.

In some aspects, the apparatus 800 may be configured to perform one or more operations described herein in connection with FIGS. 4A-4B. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

In some aspects, the determination component 808 may determine, for the apparatus 806, a first zone that includes one or more first symbols at or before a scheduled CSS, a second zone that includes one or more first symbols at or after the scheduled CSS, or a combination thereof. Accordingly, the transmission component 804 may transmit within a USS at least partially included in the first zone, at least partially included in the second zone, or a combination thereof. In some aspects, the determination component 808 may modify a length associated with the first zone, a position associated with the first zone, a length associated with the second zone, a position associated with the second zone, or a combination thereof, based at least in part on transmitting within the USS.

Additionally, or alternatively, the transmission component 804 may refrain from transmitting within a USS at least partially included in the first zone, at least partially included in the second zone, or a combination thereof.

The first zone may include a first quantity of symbols and/or exclude a second quantity of symbols. Accordingly, in some aspects, the transmission component 804 may transmit, to the apparatus 806, an indication of the first quantity of symbols, the second quantity of symbols, or a combination thereof. In some aspects, the reception component 802 may receive, from the apparatus 806, an indication of a preferred first quantity of symbols included in the first zone, a preferred second quantity of symbols excluded from the first zone, or a combination thereof. Accordingly, the indication, of the first quantity of symbols, the second quantity of symbols, or a combination thereof, may be based at least in part on the preferred first quantity of symbols, the preferred second quantity of symbols, or the combination thereof. Additionally, or alternatively, the determination component 808 may determine, using one or more rules stored in the apparatus 800, the first quantity of symbols, the second quantity of symbols, or a combination thereof.

Similarly, the second zone may include a third quantity of symbols and/or exclude a fourth quantity of symbols. Accordingly, in some aspects, the transmission component 804 may transmit, to the apparatus 806, an indication of the third quantity of symbols, the fourth quantity of symbols, or a combination thereof. In some aspects, the reception component 802 may receive, from the apparatus 806, an indication of a preferred third quantity of symbols included in the second zone, a preferred fourth quantity of symbols excluded from the second zone, or a combination thereof. Accordingly, the indication, of the third quantity of symbols, the fourth quantity of symbols, or a combination thereof, may be based at least in part on the preferred third quantity, the preferred fourth quantity, or the combination thereof. Additionally, or alternatively, the determination component 808 may determine, using one or more rules stored in the apparatus 800, the third quantity of symbols, the fourth quantity of symbols, or a combination thereof.

In any of the aspects described above, the transmission component 804 may transmit, to the apparatus 806, an indication of a subset from a set of CSSs, where the scheduled CSS is included in the subset. In some aspects, the reception component 802 may receive, from the apparatus 806, an indication of a preferred subset from the set of CSSs. Accordingly, the indication of the subset from the set of CSSs may be based at least in part on the preferred subset. Additionally, or alternatively, the determination component 808 may determine the subset from the set of CSSs.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by an apparatus, comprising: determining a first zone that includes one or more symbols at or before a scheduled common search space (CSS), a second zone that includes one or more symbols at or after the scheduled CSS, or a combination of the first zone and the second zone; and monitoring, or refraining from monitoring, an apparatus-specific search space at least partially included in the first zone, at least partially included in the second zone, or at least partially included in a combination of the first zone and the second zone.

Aspect 2: The method of Aspect 1, wherein the first zone includes a first quantity of symbols.

Aspect 3: The method of any of Aspects 1 through 2, wherein the first zone excludes a second quantity of symbols before the scheduled CSS.

Aspect 4: The method of any of Aspects 2 through 3, further comprising: receiving, from a network entity, an indication of the first quantity of symbols, the second quantity of symbols, or a combination of the first quantity and the second quantity.

Aspect 5: The method of Aspect 4, wherein the indication is included in a radio resource control message, a medium access control (MAC) control element, or downlink control information.

Aspect 6: The method of any of Aspects 4 through 5, further comprising: transmitting, to the network entity, an indication of a preferred first quantity of symbols included in the first zone, a preferred second quantity of symbols excluded from the first zone, or a combination of the preferred first quantity and the preferred second quantity, wherein the indication from the network entity is based at least in part on the preferred first quantity of symbols, the preferred second quantity of symbols, or a combination of the preferred first quantity and the preferred second quantity.

Aspect 7: The method of Aspect 6, wherein the indication to the network entity is included in a capability report, a radio resource control message, a MAC control element, or uplink control information.

Aspect 8: The method of any of Aspects 2 through 7, further comprising: determining, using one or more rules stored in a memory of the apparatus, the first quantity of symbols, the second quantity of symbols, or a combination of the first quantity and the second quantity.

Aspect 9: The method of any of Aspects 1 through 8, wherein the second zone includes a third quantity of symbols.

Aspect 10: The method of any of Aspects 1 through 9, wherein the second zone excludes a fourth quantity of symbols after the scheduled CSS.

Aspect 11: The method of any of Aspects 9 through 10, further comprising: receiving, from a network entity, an indication of the third quantity of symbols, the fourth quantity of symbols, or a combination of the third quantity and the fourth quantity.

Aspect 12: The method of Aspect 11, wherein the indication is included in a radio resource control message, a medium access control (MAC) control element, or downlink control information.

Aspect 13: The method of any of Aspects 11 through 12, further comprising: transmitting, to the network entity, an indication of a preferred third quantity of symbols included in the second zone, a preferred fourth quantity of symbols excluded from the second zone, or a combination of the preferred third quantity and the preferred fourth quantity, wherein the indication from the network entity is based at least in part on the preferred third quantity of symbols, the preferred fourth quantity of symbols, or a combination of the preferred third quantity and the preferred fourth quantity.

Aspect 14: The method of Aspect 13, wherein the indication to the network entity is included in a capability report, a radio resource control message, a MAC control element, or uplink control information.

Aspect 15: The method of any of Aspects 9 through 14, further comprising: determining, using one or more rules stored in a memory of the apparatus, the third quantity of symbols, the fourth quantity of symbols, or a combination of the third quantity and the fourth quantity.

Aspect 16: The method of any of Aspects 1 through 15, wherein the apparatus-specific search space is monitored with a lower quantity of at least one of candidates, formats, or control channel elements, based on the apparatus-specific search space being at least partially included in the first zone or the second zone.

Aspect 17: The method of any of Aspects 1 through 16, wherein the apparatus-specific search space is monitored when a format associated with the apparatus-specific search space is selected from one or more acceptable formats, based on the apparatus-specific search space being at least partially included in the first zone or the second zone.

Aspect 18: The method of any of Aspects 1 through 17, wherein the apparatus-specific search space is monitored when a beam associated with the apparatus-specific search space is a same beam associated with the CSS, based on the apparatus-specific search space being at least partially included in the first zone or the second zone.

Aspect 19: The method of any of Aspects 1 through 18, further comprising: modifying at least one of a length associated with the first zone, a position associated with the first zone, a length associated with the second zone, or a position associated with the second zone, based on monitoring the apparatus-specific search space.

Aspect 20: The method of any of Aspects 1 through 15, wherein the apparatus-specific search space is not monitored, based on the apparatus-specific search space being at least partially included in the first zone or the second zone.

Aspect 21: The method of any of Aspects 1 through 20, further comprising: receiving, from a network entity, an indication of a subset from a set of CSSs, wherein the scheduled CSS is included in the subset.

Aspect 22: The method of Aspect 21, wherein the indication is included in a radio resource control message, a medium access control (MAC) control element, or downlink control information.

Aspect 23: The method of any of Aspects 21 through 22, wherein the indication includes at least one of a periodicity associated with the subset, an offset associated with the subset, a synchronization signal block index associated with the subset, or a transmission configuration indicator state associated with the subset.

Aspect 24: The method of any of Aspects 21 through 23, further comprising: transmitting, to the network entity, an indication of a preferred subset from the set of CSSs, wherein the indication from the network entity is based at least in part on the preferred subset.

Aspect 25: The method of Aspect 24, wherein the indication to the network entity is included in a capability report, a radio resource control message, a MAC control element, or uplink control information.

Aspect 26: The method of any of Aspects 1 through 25, further comprising: determining a subset from a set of CSSs, wherein the scheduled CSS is included in the subset.

Aspect 27: The method of any of Aspects 21 through 26, wherein the subset is associated with at least one of: an activation command associated with a transmission configuration indicator (TCI) state of an active bandwidth part (BWP) that includes an initial control resource set (CORESET); an activation command associated with a TCI state for a CORESET associated with the scheduled CSS; a synchronization signal block (SSB) associated with a random access procedure; an SSB associated with a set of TCI states configured for the apparatus; an SSB associated with a set of activated TCI states for the active BWP; or a unified TCI state configured for the apparatus.

Aspect 28: A method of wireless communication performed by an apparatus, comprising: determining, for a user equipment (UE), a first zone that includes one or more first symbols at or before a scheduled common search space (CSS), a second zone that includes one or more first symbols at or after the scheduled CSS, or a combination of the first zone and the second zone; and transmitting, or refraining from transmitting, within a UE-specific search space at least partially included in the first zone, at least partially included in the second zone, or at least partially included in a combination of the first zone and the second zone.

Aspect 29: The method of Aspect 28, wherein the first zone includes a first quantity of symbols.

Aspect 30: The method of any of Aspects 28 through 29, wherein the first zone excludes a second quantity of symbols before the scheduled CSS.

Aspect 31: The method of any of Aspects 29 through 30, further comprising: transmitting, to the UE, an indication of the first quantity of symbols, the second quantity of symbols, or a combination of the first quantity and the second quantity.

Aspect 32: The method of Aspect 31, wherein the indication is included in a radio resource control message, a medium access control (MAC) control element, or downlink control information.

Aspect 33: The method of any of Aspects 31 through 32, further comprising: receiving, from the UE, an indication of a preferred first quantity of symbols included in the first zone, a preferred second quantity of symbols excluded from the first zone, or a combination of the preferred first quantity and the preferred second quantity, wherein the indication to the UE is based at least in part on the preferred first quantity of symbols, the preferred second quantity of symbols, or a combination of the preferred first quantity and the preferred second quantity.

Aspect 34: The method of Aspect 33, wherein the indication from the UE is included in a UE capability report, a radio resource control message, a MAC control element, or uplink control information.

Aspect 35: The method of any of Aspects 29 through 34, further comprising: determining, using one or more rules stored in a memory of the apparatus, the first quantity of symbols, the second quantity of symbols, or a combination of the first quantity and the second quantity.

Aspect 36: The method of any of Aspects 28 through 35, wherein the second zone includes a third quantity of symbols.

Aspect 37: The method of any of Aspects 28 through 36, wherein the second zone excludes a fourth quantity of symbols after the scheduled CSS.

Aspect 38: The method of any of Aspects 36 through 37, further comprising: transmitting, to the UE, an indication of the third quantity of symbols, the fourth quantity of symbols, or a combination of the third quantity and the fourth quantity.

Aspect 39: The method of Aspect 38, wherein the indication is included in a radio resource control message, a medium access control (MAC) control element, or downlink control information.

Aspect 40: The method of any of Aspects 38 through 39, further comprising: receiving, from the UE, an indication of a preferred third quantity of symbols included in the second zone, a preferred fourth quantity of symbols excluded from the second zone, or a combination of the preferred third quantity and the preferred fourth quantity, wherein the indication to the UE is based at least in part on the preferred third quantity, the preferred fourth quantity, or a combination of the preferred third quantity and the preferred fourth quantity.

Aspect 41: The method of Aspect 40, wherein the indication from the UE is included in a UE capability report, a radio resource control message, a MAC control element, or uplink control information.

Aspect 42: The method of any of Aspects 36 through 41, further comprising: determining, using one or more rules stored in a memory of the apparatus, the third quantity of symbols, the fourth quantity of symbols, or a combination of the third quantity and the fourth quantity.

Aspect 43: The method of any of Aspects 28 through 42, wherein the UE-specific search space is used for transmission with a lower quantity of at least one of candidates, formats, or control channel elements, based on the UE-specific search space being at least partially included in the first zone or the second zone.

Aspect 44: The method of any of Aspects 28 through 43, wherein the UE-specific search space is used for transmission when a format associated with the UE-specific search space is selected from one or more acceptable formats, based on the UE-specific search space being at least partially included in the first zone or the second zone.

Aspect 45: The method of any of Aspects 28 through 44, wherein the UE-specific search space is used for transmission when a beam associated with the UE-specific search space is a same beam associated with the CSS, based on the UE-specific search space being at least partially included in the first zone or the second zone.

Aspect 46: The method of any of Aspects 28 through 45, further comprising: modifying at least one of a length associated with the first zone, a position associated with the first zone, a length associated with the second zone, or a position associated with the second zone, based on transmitting within the UE-specific search space.

Aspect 47: The method of any of Aspects 28 through 42, wherein the UE-specific search space is not used for transmission, based on the UE-specific search space being at least partially included in the first zone or the second zone.

Aspect 48: The method of any of Aspects 28 through 47, further comprising: transmitting, to the UE, an indication of a subset from a set of CSSs, wherein the scheduled CSS is included in the subset.

Aspect 49: The method of Aspect 48, wherein the indication is included in a radio resource control message, a medium access control (MAC) control element, or downlink control information.

Aspect 50: The method of any of Aspects 48 through 49, wherein the indication includes at least one of a periodicity associated with the subset, an offset associated with the subset, a synchronization signal block index associated with the subset, or a transmission configuration indicator state associated with the subset.

Aspect 51: The method of any of Aspects 48 through 50, further comprising: receiving, from the UE, an indication of a preferred subset from the set of CSSs, wherein the indication to the UE is based on the preferred subset.

Aspect 52: The method of Aspect 51, wherein the indication from the UE is included in a UE capability report, a radio resource control message, a MAC control element, or uplink control information.

Aspect 53: The method of any of Aspects 28 through 52, further comprising: determining a subset from a set of CSSs, wherein the scheduled CSS is included in the subset.

Aspect 54: The method of any of Aspects 48 through 53, wherein the subset is associated with at least one of: an activation command associated with a transmission configuration indicator (TCI) state of an active bandwidth part (BWP) that includes an initial control resource set (CORESET); an activation command associated with a TCI state for a CORESET associated with the scheduled CSS; a synchronization signal block (SSB) associated with a random access procedure; an SSB associated with a set of TCI states configured for the UE; an SSB associated with a set of activated TCI states for the active BWP; or a unified TCI state configured for the UE.

Aspect 55: An apparatus for wireless communication at a device, comprising a processor; memory coupled with the processor; and instructions stored in the memory and executable by the processor to cause the apparatus to perform the method of one or more Aspects of Aspects 1-27.

Aspect 56: A device for wireless communication, comprising a memory and one or more processors coupled to the memory, the one or more processors configured to perform the method of one or more Aspects of Aspects 1-27.

Aspect 57: An apparatus for wireless communication, comprising at least one means for performing the method of one or more Aspects of Aspects 1-27.

Aspect 58: A non-transitory computer-readable medium storing code for wireless communication, the code comprising instructions executable by a processor to perform the method of one or more Aspects of Aspects 1-27.

Aspect 59: A non-transitory computer-readable medium storing a set of instructions for wireless communication, the set of instructions comprising one or more instructions that, when executed by one or more processors of a device, cause the device to perform the method of one or more Aspects of Aspects 1-27.

Aspect 60: An apparatus for wireless communication at a device, comprising a processor; memory coupled with the processor; and instructions stored in the memory and executable by the processor to cause the apparatus to perform the method of one or more Aspects of Aspects 28-54.

Aspect 61: A device for wireless communication, comprising a memory and one or more processors coupled to the memory, the one or more processors configured to perform the method of one or more Aspects of Aspects 28-54.

Aspect 62: An apparatus for wireless communication, comprising at least one means for performing the method of one or more Aspects of Aspects 28-54.

Aspect 63: A non-transitory computer-readable medium storing code for wireless communication, the code comprising instructions executable by a processor to perform the method of one or more Aspects of Aspects 28-54.

Aspect 64: A non-transitory computer-readable medium storing a set of instructions for wireless communication, the set of instructions comprising one or more instructions that, when executed by one or more processors of a device, cause the device to perform the method of one or more Aspects of Aspects 28-54.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
 a memory; and
 one or more processors coupled to the memory, wherein the one or more processors are configured to:
  determine a first zone and a second zone associated with a scheduled common search space (CSS), wherein:
   the first zone includes a first quantity of symbols,
   the first zone ends a second quantity of symbols before the scheduled CSS,
   the first zone begins a first sum quantity of symbols before the scheduled CSS,
   the first sum quantity is a sum of the first quantity and the second quantity,
   the second zone includes one or more symbols, and
   the second zone begins after an end of the scheduled CSS; and
  monitor, or refrain from monitoring, an apparatus-specific search space at least partially included in:
   the first zone,
   the second zone, or
   a combination of the first zone and the second zone.

2. The apparatus of claim 1, wherein the second quantity is zero.

3. The apparatus of claim 1, wherein the one or more processors are further configured to:
 receive an indication, from a network entity, of the first quantity, the second quantity, or a combination of the first quantity and the second quantity.

4. The apparatus of claim 3, wherein the indication is included in a radio resource control message, a medium access control (MAC) control element, or downlink control information.

5. The apparatus of claim 3, wherein the one or more processors are further configured to:
 transmit an indication, to the network entity, of a preferred first quantity of symbols included in the first zone, a preferred second quantity of symbols excluded from the first zone, or a combination of the preferred first quantity and the preferred second quantity,
  wherein the indication from the network entity is based on the preferred first quantity, the preferred second quantity, or a combination of the preferred first quantity and the preferred second quantity.

6. The apparatus of claim 5, wherein the indication to the network entity is included in a capability report, a radio resource control message, a medium access control (MAC) control element, or uplink control information.

7. The apparatus of claim 1, wherein the one or more processors are further configured to:
 determine, using one or more rules stored in the memory, the first quantity, the second quantity, or a combination of the first quantity and the second quantity.

8. The apparatus of claim 1, wherein the second zone includes a third quantity of symbols.

9. The apparatus of claim 8, wherein:
 the second zone begins a fourth quantity of symbols after the end of the scheduled CSS,
 the second zone ends a second sum quantity of symbols after the end of the scheduled CSS, and
 the second sum quantity is a sum of the third quantity and the fourth quantity.

10. The apparatus of claim 9, wherein the one or more processors are further configured to:
 receive, from a network entity, an indication of the third quantity, the fourth quantity, or a combination of the third quantity and the fourth quantity.

11. The apparatus of claim 10, wherein the indication is included in a radio resource control message, a medium access control (MAC) control element, or downlink control information.

12. The apparatus of claim 10, wherein the one or more processors are further configured to:
 transmit, to the network entity, an indication of a preferred third quantity of symbols included in the second zone, a preferred fourth quantity of symbols excluded from the second zone, or a combination of the preferred third quantity and the preferred fourth quantity,
  wherein the indication from the network entity is based on the preferred third quantity, the preferred fourth quantity, or a combination of the preferred third quantity and the preferred fourth quantity.

13. The apparatus of claim 12, wherein the indication to the network entity is included in a capability report, a radio resource control message, a medium access control (MAC) control element, or uplink control information.

14. The apparatus of claim 9, wherein the one or more processors are further configured to:
 determine, using one or more rules stored in the memory, the third quantity, the fourth quantity, or a combination of third quantity and the fourth quantity.

15. The apparatus of claim 1, wherein the apparatus-specific search space is not monitored, based on the apparatus-specific search space being at least partially included in the first zone or the second zone.

16. The apparatus of claim 1, wherein the apparatus-specific search space is monitored with a lower quantity of at least one of candidates, formats, or control channel elements, based on the apparatus-specific search space being at least partially included in the first zone or the second zone.

17. The apparatus of claim 1, wherein the apparatus-specific search space is monitored when a format associated with the apparatus-specific search space is selected from one or more acceptable formats, based on the apparatus-specific search space being at least partially included in the first zone or the second zone.

18. The apparatus of claim 1, wherein the apparatus-specific search space is monitored when a beam associated with the apparatus-specific search space is a same beam associated with the CSS, based on the apparatus-specific search space being at least partially included in the first zone or the second zone.

19. The apparatus of claim 1, wherein the one or more processors are further configured to:
modify at least one of a length associated with the first zone, a position associated with the first zone, a length associated with the second zone, or a position associated with the second zone, based on monitoring the apparatus-specific search space.

20. The apparatus of claim 1, wherein the one or more processors are further configured to:
receive, from a network entity, an indication of a subset from a set of CSSs,
wherein the scheduled CSS is included in the subset.

21. The apparatus of claim 20, wherein the indication is included in a radio resource control message, a medium access control (MAC) control element, or downlink control information.

22. The apparatus of claim 20, wherein the indication includes at least one of a periodicity associated with the subset, an offset associated with the subset, a synchronization signal block index associated with the subset, or a transmission configuration indicator state associated with the subset.

23. The apparatus of claim 20, wherein the one or more processors are further configured to:
transmit, to the network entity, an indication of a preferred subset from the set of CSSs,
wherein the indication from the network entity is based on the preferred subset.

24. The apparatus of claim 23, wherein the indication to the network entity is included in a capability report, a radio resource control message, a medium access control (MAC) control element, or uplink control information.

25. The apparatus of claim 1, wherein the one or more processors are further configured to:
determine a subset from a set of CSSs,
wherein the scheduled CSS is included in the subset.

26. The apparatus of claim 25, wherein the subset is associated with at least one of:
an activation command associated with a transmission configuration indicator (TCI) state of an active bandwidth part (BWP) that includes an initial control resource set (CORESET);
an activation command associated with a TCI state for a CORESET associated with the scheduled CSS;
a synchronization signal block (SSB) associated with a random access procedure;
an SSB associated with a set of TCI states configured for the apparatus;
an SSB associated with a set of activated TCI states for the active BWP; or
a unified TCI state configured for the apparatus.

27. A method of wireless communication performed by an apparatus, comprising:
determining a first zone and a second zone associated with a scheduled common search space (CSS), wherein:
the first zone includes a first quantity of symbols,
the first zone ends a second quantity of symbols before the scheduled CSS,
the first zone begins a first sum quantity of symbols before the scheduled CSS,
the first sum quantity is a sum of the first quantity and the second quantity,
the second zone includes one or more symbols, and
the second zone begins after an end of the scheduled CSS; and
monitoring, or refraining from monitoring, an apparatus-specific search space at least partially included in:
the first zone,
the second zone, or
a combination of the first zone and the second zone.

28. The method of claim 27, wherein the second quantity is zero.

29. A non-transitory computer-readable medium having instructions stored thereon that, when executed by one or more processors of an apparatus, cause the apparatus to:
determine a first zone and a second zone associated with a scheduled common search space (CSS), wherein:
the first zone includes a first quantity of symbols,
the first zone ends a second quantity of symbols before the scheduled CSS,
the first zone begins a first sum quantity of symbols before the scheduled CSS,
the first sum quantity is a sum of the first quantity and the second quantity,
the second zone includes one or more symbols, and
the second zone begins after an end of the scheduled CSS; and
monitor, or refraining from monitoring, an apparatus-specific search space at least partially included in:
the first zone,
the second zone, or
a combination of the first zone and the second zone.

30. An apparatus for wireless communication, comprising:
means for determining a first zone and a second zone associated with a scheduled common search space (CSS), wherein:
the first zone includes a first quantity of symbols,
the first zone ends a second quantity of symbols before the scheduled CSS,
the first zone begins a first sum quantity of symbols before the scheduled CSS,
the first sum quantity is a sum of the first quantity and the second quantity,
the second zone includes one or more symbols, and
the second zone begins after an end of the scheduled CSS; and
means for monitoring, or means for refraining from monitoring, an apparatus-specific search space at least partially included in:
the first zone,
the second zone, or
a combination of the first zone and the second zone.

* * * * *